United States Patent
Maruyama

(10) Patent No.: US 10,640,380 B2
(45) Date of Patent: May 5, 2020

(54) HIGH-DENSITY CARBON NANOTUBE AGGREGATE AND METHOD OF PRODUCING HIGH-DENSITY CARBON NANOTUBE AGGREGATE

(71) Applicant: HITACHI ZOSEN CORPORATION, Osaka-shi, Osaka (JP)

(72) Inventor: Hiroyuki Maruyama, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 0 days.

(21) Appl. No.: 15/553,382

(22) PCT Filed: Feb. 24, 2016

(86) PCT No.: PCT/JP2016/055480
§ 371 (c)(1),
(2) Date: Aug. 24, 2017

(87) PCT Pub. No.: WO2016/136825
PCT Pub. Date: Sep. 1, 2016

(65) Prior Publication Data
US 2018/0118571 A1    May 3, 2018

(30) Foreign Application Priority Data

Feb. 27, 2015   (JP) .................................. 2015-038369

(51) Int. Cl.
*C01B 32/21*    (2017.01)
*C01B 32/05*    (2017.01)
(Continued)

(52) U.S. Cl.
CPC ............. *C01B 32/05* (2017.08); *B01J 20/205* (2013.01); *B82Y 30/00* (2013.01); *B82Y 40/00* (2013.01);
(Continued)

(58) Field of Classification Search
CPC ....... C01B 32/05; C01B 32/162; C01B 32/21; C01B 32/17; B01J 20/20; B01J 20/205; B82Y 30/00; B82Y 40/00
See application file for complete search history.

(56) References Cited

U.S. PATENT DOCUMENTS

2003/0027471 A1 *  2/2003  Shimazaki ................ D01F 9/22
                                                         442/59
2004/0036060 A1    2/2004  Morita et al.
(Continued)

FOREIGN PATENT DOCUMENTS

CN    104918881 A   9/2015
JP    2002-266170 A  9/2002
(Continued)

OTHER PUBLICATIONS

Second Chinese Office Action for application No. 201680011231 dated Jun. 19, 2019 (Year: 2019).*
(Continued)

*Primary Examiner* — Alexander Usyatinsky
(74) *Attorney, Agent, or Firm* — Pillsbury Winthrop Shaw Pittman, LLP

(57) ABSTRACT

A method of producing a high-density carbon nanotube aggregate includes the steps of: preparing a carbon nanotube array including a plurality of carbon nanotubes aligned on a substrate and oriented vertically to the substrate; and heating the carbon nanotube array to 2,600° C. or higher.

6 Claims, 13 Drawing Sheets

(51) Int. Cl.
*B82Y 30/00* (2011.01)
*B82Y 40/00* (2011.01)
*C01B 32/17* (2017.01)
*C01B 32/162* (2017.01)
*B01J 20/20* (2006.01)

(52) U.S. Cl.
CPC ............ *C01B 32/162* (2017.08); *C01B 32/17* (2017.08); *C01B 32/21* (2017.08); *C01P 2004/64* (2013.01)

(56) References Cited

U.S. PATENT DOCUMENTS

| | | | |
|---|---|---|---|
| 2007/0179050 A1* | 8/2007 | Ma | B01J 27/22 502/182 |
| 2009/0028779 A1 | 1/2009 | Wang et al. | |
| 2009/0053515 A1 | 2/2009 | Luo et al. | |
| 2009/0272935 A1* | 11/2009 | Hata | B01J 20/20 252/70 |
| 2010/0159222 A1 | 6/2010 | Hata et al. | |
| 2011/0008617 A1 | 1/2011 | Hata et al. | |
| 2011/0127472 A1* | 6/2011 | Sato | B82Y 30/00 252/511 |
| 2013/0251619 A1* | 9/2013 | Rikihisa | B82Y 30/00 423/447.2 |
| 2015/0093322 A1 | 4/2015 | Yamamoto et al. | |
| 2015/0298974 A1 | 10/2015 | Kim et al. | |

FOREIGN PATENT DOCUMENTS

| | | |
|---|---|---|
| JP | 2004-127713 A | 4/2004 |
| JP | 2007182352 A | 7/2007 |
| JP | 2008-120658 A | 5/2008 |
| JP | 2008-138348 A | 6/2008 |
| JP | 2008138348 * | 6/2008 |
| JP | 2009-012176 A | 1/2009 |
| JP | 2009012176 * | 1/2009 |
| JP | 2009-051725 A | 3/2009 |
| JP | 2009-057407 A | 3/2009 |
| TW | 201410597 A | 3/2014 |
| WO | 2016/136826 A1 | 9/2016 |

OTHER PUBLICATIONS

International Search Report PCT/JP2016/055480 dated Apr. 12, 2016 with English translation.
International Preliminary Report on Patentability PCT/JP2016/055480 dated Aug. 29, 2017 with English translation.
Kentaro Miyoshi et al., "Practical Applications of High-Performance Fluorinated Resin with Low-Content Aligned Carbon Nanotube", Taiyo Nippon Sanso Corporation Technical Report No. 32 (2013), 2 pgs. with English translation.
Second Office Action dated Jun. 19, 2019 issued in corresponding Chinese Patent Application No. 201680011231.X with English translation.
"University Physics Experiment" edited by Du Yinxiao, Henan Science and Technology Publishing House, pp. 154-155, Aug. 2012, with English translation.
"Analysis and Application of Raman Spectroscopy" Yang Xugang et al., National Defense Industry Press, pp. 229-234, Nov. 2008, with English translation.
Extended European Search Report EP Application No. 16755569.7 dated Oct. 9, 2018.

* cited by examiner

HIGH-DENSITY CARBON NANOTUBE AGGREGATE AND METHOD OF PRODUCING HIGH-DENSITY CARBON NANOTUBE AGGREGATE

CROSS-REFERENCE TO RELATED APPLICATIONS

This application is the U.S. National Stage of PCT/JP2016/055480, filed Feb. 24, 2016, which in turn claims priority to Japanese Patent Application No. JP 2015-038369, filed Feb. 27, 2015. The contents of these applications are incorporated herein by reference in their entireties.

TECHNICAL FIELD

The present invention relates to a high-density carbon nanotube aggregate and a method of producing the high-density carbon nanotube aggregate.

BACKGROUND

A carbon nanotube is known to have an excellent mechanical strength, thermal conductivity, and electric conductivity. It has been studied to grow a plurality of carbon nanotubes to make a carbon nanotube array and use such carbon nanotube arrays in various industrial products.

It is desired to increase the density of the plurality of carbon nanotubes in the carbon nanotube array so as to further increase the thermal conductivity and the electric conductivity. Various methods of producing a carbon nanotube array having a high density have been studied.

For example, a method of producing an oriented carbon nanotube bulk aggregate has been proposed, in which the chemical vapor deposition is used to grow a plurality of carbon nanotubes on a substrate so as to be oriented vertically to the substrate surface, then the plurality of carbon nanotubes are separated from the substrate, the plurality of separated carbon nanotubes are exposed to a liquid such as water and then dried (see, e.g., Patent Document 1).

Through this method of producing the oriented carbon nanotube bulk aggregate, one can produce an oriented carbon nanotube bulk aggregate having a density of 0.2 to 1.5 g/cm$^3$.

RELEVANT REFERENCES

List of Relevant Patent Document

Patent Document 1: Japanese Patent Application Publication No. 2007-182352

SUMMARY

However, in the method of producing the oriented carbon nanotube bulk aggregate disclosed in Patent Document 1, the orientation of the plurality of carbon nanotubes may be disordered when the plurality of carbon nanotubes are exposed to the liquid, and thus, it is difficult to maintain the orientation of the plurality of carbon nanotubes in the oriented carbon nanotube bulk aggregate.

Therefore, in such an oriented carbon nanotube bulk aggregate, there is limitation in increasing the thermal conductivity and the electric conductivity in the direction of the orientation of the carbon nanotubes.

One object of the present invention is to provide a high-density carbon nanotube aggregate and a method of producing the high-density carbon nanotube aggregate that can increase the thermal conductivity and the electric conductivity in the direction of the orientation of the carbon nanotubes.

The first aspect of the present invention includes a method of producing a high-density carbon nanotube aggregate comprising the steps of: preparing a carbon nanotube array including a plurality of carbon nanotubes aligned on a substrate and oriented vertically to the substrate; and heating the carbon nanotube array to 2,600° C. or higher.

According to such a method, a carbon nanotube array constituted by a plurality of carbon nanotubes oriented vertically to the substrate is heated to 2,600° C. or higher. Therefore, the crystallinity of the graphene constituting the carbon nanotube is improved and the orientation (straightness) of the carbon nanotube is improved.

When the orientation (straightness) of the carbon nanotube is improved, carbon nanotubes adjacent to each other aggregate in the carbon nanotube array.

As a result, in the high-density carbon nanotube aggregate, it is possible to increase the average density of the plurality of carbon nanotubes while maintaining the orientation of the plurality of carbon nanotubes, and it is also possible to uniform the density of the plurality of carbon nanotubes. Thus, in the high-density carbon nanotube aggregate, it is possible to improve both the thermal conductivity and the electric conductivity in the direction of orientation of the carbon nanotubes.

That is, according to the method of producing a high-density carbon nanotube aggregate of the present invention, it is possible to produce in a simple manner a high-density carbon nanotube aggregate having an improved thermal conductivity and electric conductivity in the direction of orientation of the carbon nano tube.

The second aspect of the present invention includes the method of producing a high-density carbon nanotube aggregate of the first aspect, wherein heating the carbon nanotube array comprises: separating the carbon nanotube array from the substrate; and then heating the carbon nanotube array.

According to such a method, the carbon nanotube array separated from the substrate is subjected to a heat treatment. Therefore, in the carbon nanotube array, the plurality of carbon nanotubes can be smoothly aggregated so as to maintain the orientation.

In addition, when the carbon nanotube array aligned on the substrate is heated to 2,600° C. or higher, the substrate dissolves and the dissolved substrate may be adhered to the carbon nanotube array or a heating furnace for heating the carbon nanotube array.

On the other hand, according to the above method, the carbon nanotube array separated from the substrate is subjected to heat treatment. Therefore, dissolution of the substrate can be suppressed, and as a result, it can be suppressed that the dissolved substrate adhere to the carbon nanotube array or a heating furnace.

The third aspect of the present invention includes the method of producing a high-density carbon nanotube aggregate of the first or second aspect, wherein heating the carbon nanotube array comprises heating the carbon nanotube array in a no-load state.

However, when heat treatment is performed in a state where a load is applied to the carbon nanotube array, the aggregation of the plurality of carbon nanotubes is inhibited, and the high-density carbon nanotube aggregate may be broken due to the load.

On the other hand, according to the above method, the carbon nanotube array is heated in a no-load state. Therefore, smooth aggregation of the plurality of carbon nanotubes is secured, and the breakage of the high-density carbon nanotube aggregate can be suppressed.

The fourth aspect of the present invention includes the method of producing a high-density carbon nanotube aggregate of any one of the first to third aspects, further comprising cooling the carbon nanotube array to 2,000° C. or lower after heating the carbon nanotube array, wherein the steps of heating the carbon nanotube array and cooling the carbon nanotube array are repeated sequentially.

According to such a method, the step of heating the carbon nanotube array and the step of cooling the carbon nanotube array are sequentially repeated. Therefore, it is possible to further improve the crystallinity of the graphene constituting the carbon nanotube. As a result, the thermal conductivity and the electric conductivity of the high-density carbon nanotube aggregate can be reliably improved.

The fifth aspect of the present invention includes the method of producing a high-density carbon nanotube aggregate of any one of the first to fourth aspect, further comprising supplying a liquid to the carbon nanotube array after heating the carbon nanotube array.

According to such a method, a liquid is supplied to the heated carbon nanotube array. However, in the heated carbon nanotube array, the average density of the plurality of carbon nanotubes is increased. Therefore, even when the liquid is supplied, the orientation of the plurality of carbon nanotubes can be secured.

Then, as the liquid is vaporized, carbon nanotubes adjacent to each other are aggregated in the heated carbon nanotube array. Therefore, the density of the high-density carbon nanotube aggregate can be further increased.

The sixth aspect of the present invention includes a high-density carbon nanotube aggregate produced by the method of producing a high-density carbon nanotube aggregate of any one of the first to fifth aspects.

Therefore, it is possible to improve both the thermal conductivity and the electric conductivity in the direction of orientation of the carbon nanotube.

The seventh aspect of the present invention includes a high-density carbon nanotube aggregate, comprising: a plurality of carbon nanotubes oriented in a predetermined direction, the plurality of carbon nanotubes being arranged in a sheet form continuously with each other in a direction orthogonal to the predetermined direction without being continuous with each other in the predetermined direction, wherein an average bulk density of the plurality of carbon nanotubes arranged in the sheet form is from greater than 50 mg/cm$^3$ to 200 mg/cm$^3$, in the plurality of carbon nanotubes arranged in the sheet form, a proportion of bulk density of each portion to the average bulk density is from 80% to 120%, and a shape of the high-density carbon nanotube aggregate is maintained such that the plurality of carbon nanotubes are in contact with each other.

With this arrangement, the average bulk density of a plurality of carbon nanotubes oriented in a predetermined direction and arranged in a sheet form is from greater than 50 mg/cm$^3$ to 200 mg/cm$^3$. In the plurality of carbon nanotubes arranged in a sheet form, the proportion of the density of each portion to the average bulk density is from 80% to 120%.

Therefore, it is possible to improve both the thermal conductivity and the electric conductivity in the direction of orientation of the carbon nanotube.

Advantages

According to the method of producing a high-density carbon nanotube aggregate of the present invention, it is possible to produce in a simple manner a high-density carbon nanotube aggregate having an improved thermal conductivity and electric conductivity in the direction of orientation of the carbon nanotube.

Further, in the high-density carbon nanotube aggregate of the present invention, it is possible to improve both the thermal conductivity and the electric conductivity in the direction of orientation of the carbon nanotube.

DESCRIPTION OF EXAMPLE EMBODIMENTS

1. Constitution of the High-Density Carbon Nanotube Aggregate

Figure 3A:
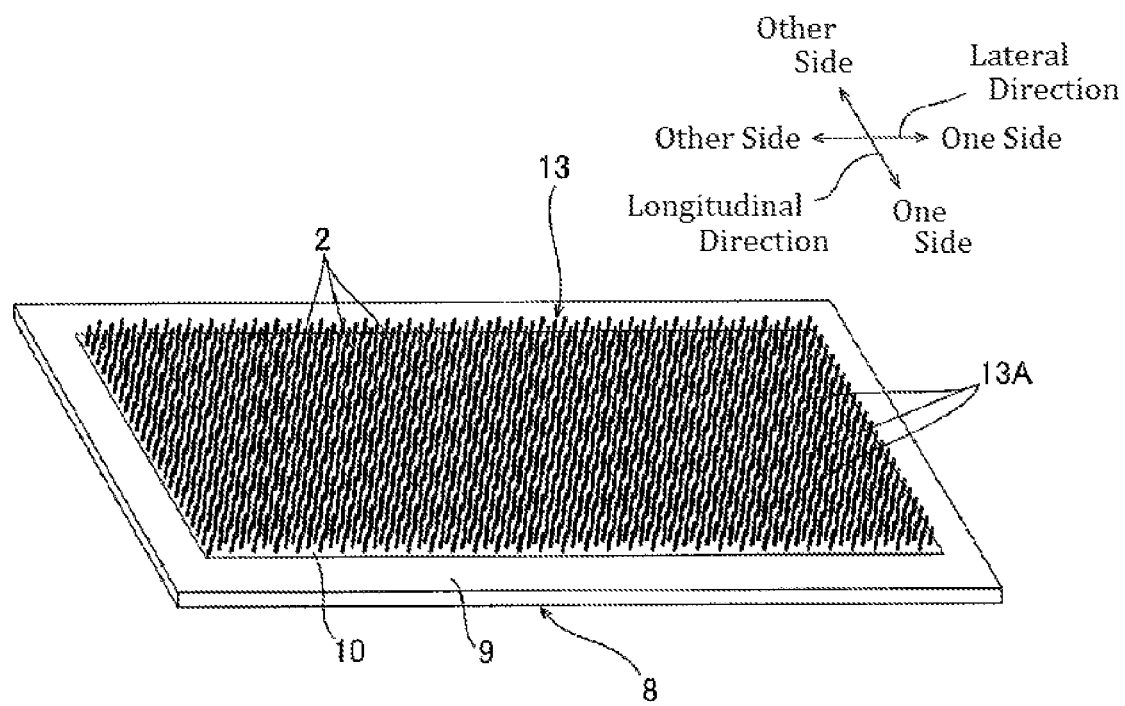
FIG. 3A is a perspective view of the carbon nanotube array and the substrate shown in FIG. 1C, in which the carbon nanotube array is aligned on the substrate.
Figure 3B:
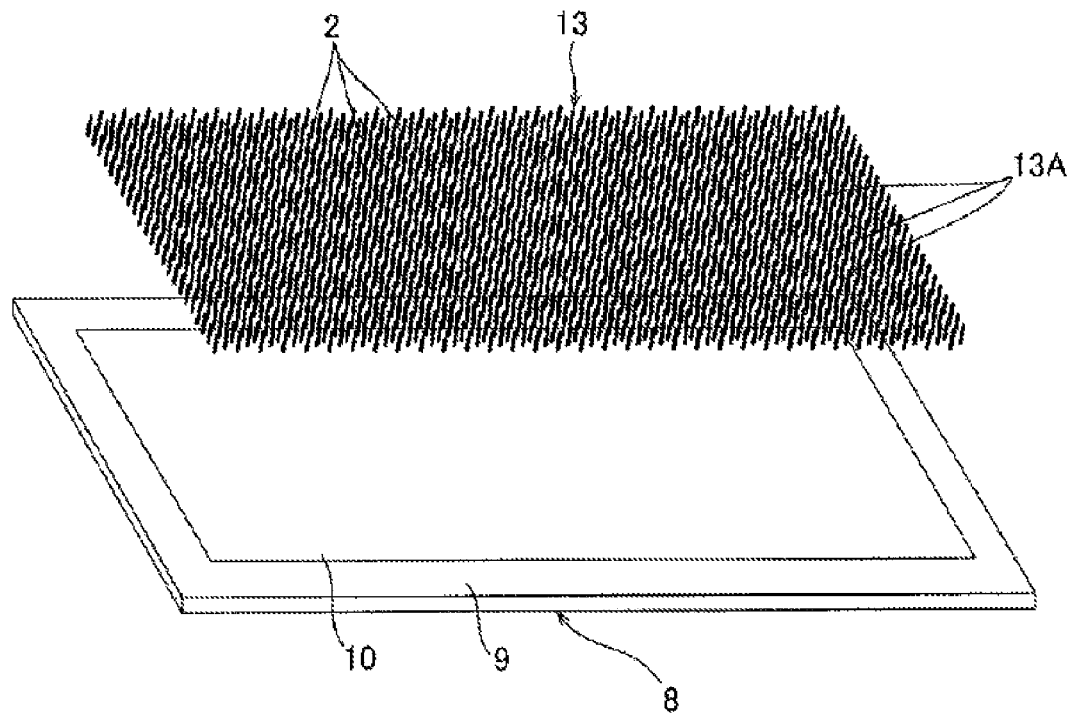
FIG. 3B is a perspective view of the carbon nanotube array and the substrate shown in FIG. 3A, in which the carbon nanotube array is separated from the substrate.
Figure 3C:
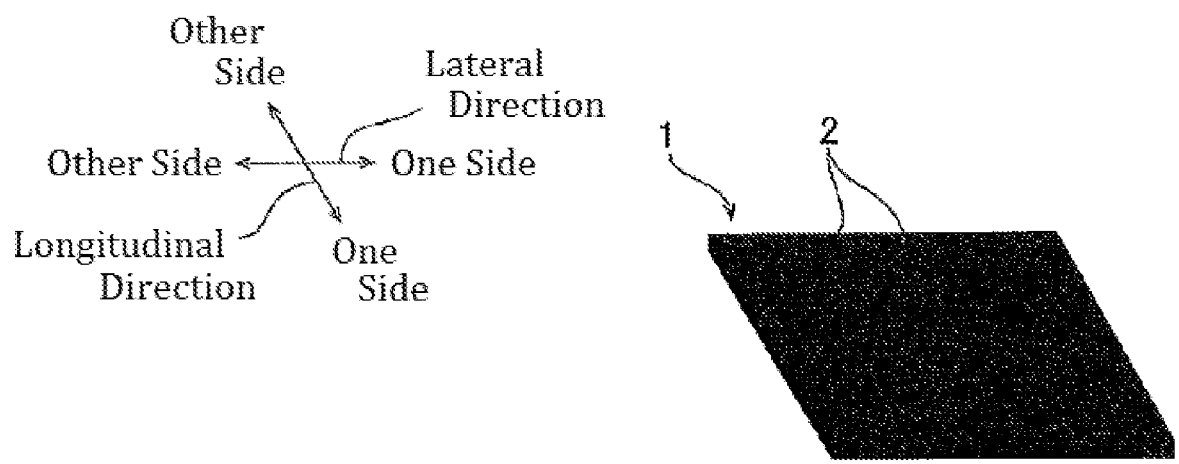
FIG. 3C is a perspective view of the high-density carbon nanotube aggregate shown in FIG. 2C.

As shown in FIG. 3C, the high-density carbon nanotube aggregate 1 may be in a flexible sheet form (film form). Specifically, the high-density carbon nanotube aggregate 1 may have a thickness in a predetermined direction, extend in a surface directions (the longitudinal direction and the lateral direction) orthogonal to the predetermined direction (the thickness direction), and have a flat top surface and a flat bottom surface.

The thickness of the high-density carbon nanotube aggregate 1 may be, for example, from 10 μm, or preferably 100 μm, to 1,000 μm, or preferably 400 μm.

The shape of the high-density carbon nanotube aggregate 1 is not particularly limited, and may be, for example, a polygonal shape or a circular shape, or preferably a rectangular shape when viewed from the thickness direction.

When the high-density carbon nanotube aggregate 1 has a rectangular shape when viewed from the thickness direction, the dimension of the high-density carbon nanotube aggregate 1 in the longitudinal direction may be, for example, from 1 mm, preferably 10 mm, or more preferably 25 mm, to 300 mm, or preferably 50 mm, and the dimension of the high-density carbon nanotube aggregate 1 in the lateral direction may be, for example, from 1 mm, preferably 10 mm, or more preferably 25 mm, to 200 mm, or more preferably 50 mm.

Figure 2A:
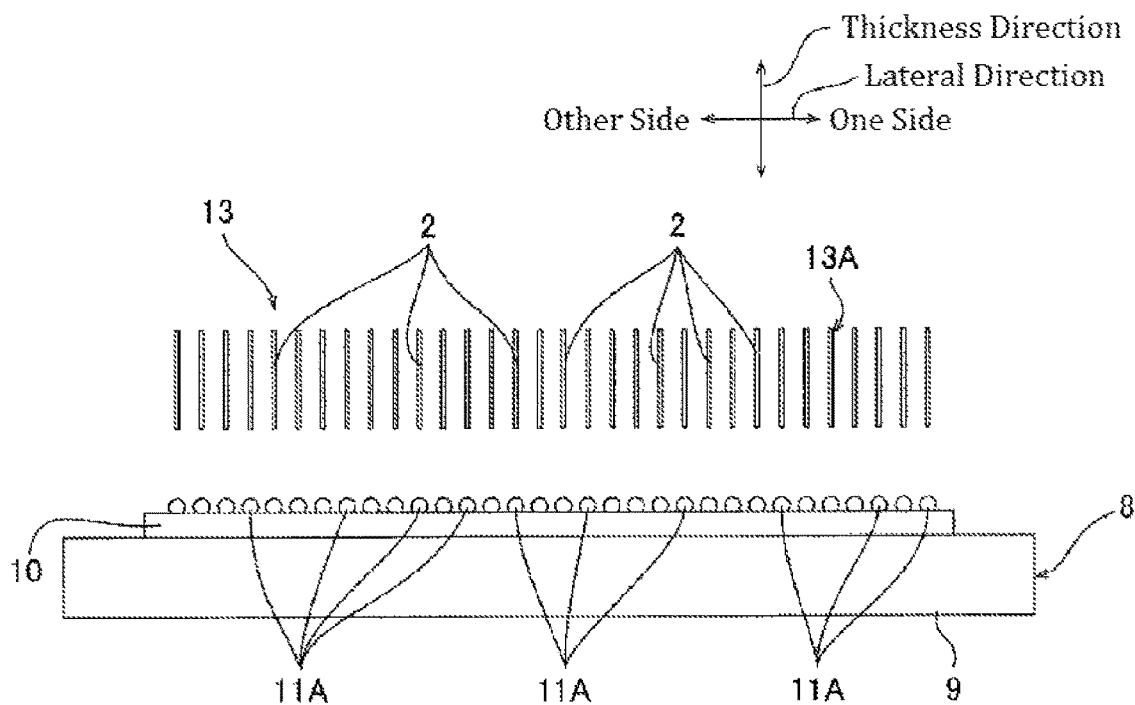
FIG. 2A shows a step subsequent to FIG. 1D, in which the carbon nanotube array is separated from the substrate.
Figure 2B:
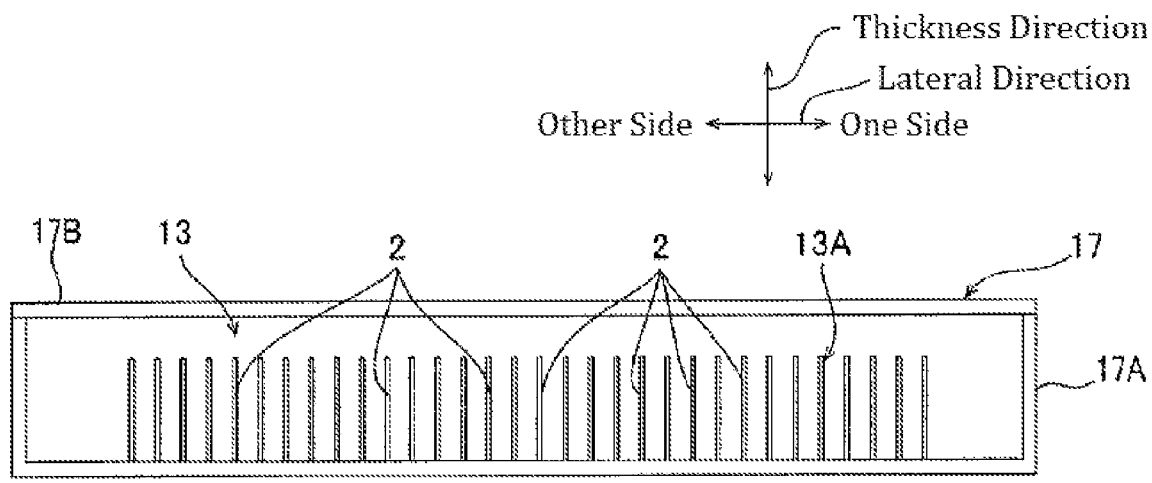
FIG. 2B shows a step subsequent to FIG. 2A, in which the carbon nanotube array is placed in a heat-resistant container.
Figure 2C:
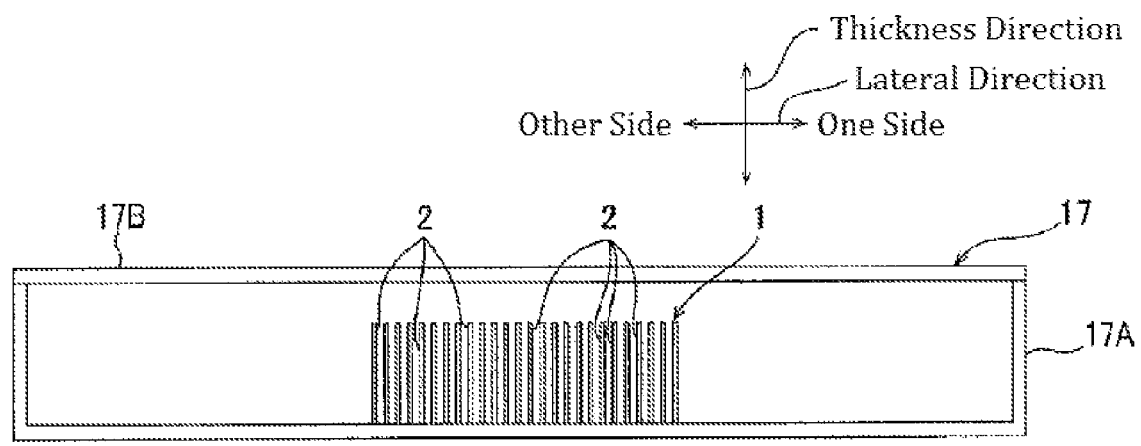
FIG. 2C shows a step subsequent to FIG. 2B, in which the carbon nanotube array is heated to produce a high-density carbon nanotube aggregate.

As shown in FIG. 2C, the high-density carbon nanotube aggregate 1 may be constituted by a plurality of carbon nanotubes 2.

The plurality of carbon nanotubes 2 may be oriented in the thickness direction and arranged in a sheet form continuously with each other in the surface direction (the longitudinal direction and the lateral direction) without being continuous with each other in the thickness direction. As a result, the high-density carbon nanotube aggregate 1 may maintain its shape so that the plurality of carbon nanotubes 2 are in contact with each other. Among the plurality of carbon nanotubes 2, any two carbon nanotubes 2 adjacent to each other may be subjected to a van der Waals force acting therebetween.

Each of the plurality of carbon nanotubes 2 may be any of a single-walled carbon nanotube, a double-walled carbon nanotube, and a multi-walled carbon nanotube, but it is preferably a multi-walled carbon nanotube. These types of carbon nanotubes 2 can be used either singly or combinedly.

The average outer diameter of each of the plurality of carbon nanotubes 2 may be, for example, from 1 nm, or preferably 5 nm, to 100 nm, preferably 50 nm, or more preferably 20 nm.

The average length (the average dimension in the direction of orientation) of each of the plurality of carbon nanotubes 2 is not particularly limited, and may be, for example, from 10 μm, preferably 100 μm, or more preferably 200 μm, to 1,000 μm, preferably 500 μm, or more preferably 400 μm. The average outer diameter and the average length of the carbon nanotubes 2 are measured by a known method such as electron microscope observation, for example.

In the high-density carbon nanotube aggregate 1, the average bulk density of the plurality of carbon nanotubes 2 may be from greater than 50 mg/cm$^3$, or preferably from 60 mg/cm$^3$, or more preferably 100 mg/cm$^3$, to 300 mg/cm$^3$, preferably 200 mg/cm$^3$, or more preferably 150 mg/cm$^3$. The average bulk density of the carbon nanotube 2 may be calculated from, for example, the mass per unit area (basis weight (mg/cm$^2$)) and the average length of the carbon nanotubes (measured by SEM (from JEOL Ltd) or non-contact film thickness meter (from KEYENCE Corporation)).

In the high-density carbon nanotube aggregate 1, the proportion of the bulk density of each portion to the average bulk density (that is, the percentage of the bulk density of a particular (any) portion to the average bulk density of the high-density carbon nanotube aggregate 1 set at 100%) may be from 80%, or preferably 90%, to 120%, or preferably 110%.

The proportion of the bulk density of each portion of the high-density carbon nanotube aggregate 1 to the average bulk density can be obtained, for example, by equally dividing the high-density carbon nanotube aggregate 1 into a plurality of portions (for example, three portions) having an equal volume, calculating the bulk density of each portion of the equally divided high-density carbon nanotube aggregate 1 in the same manner as the above-mentioned average bulk density, and calculating the percentage of the bulk density of each portion to the above-mentioned average bulk density.

The average G/D ratio of the high-density carbon nanotube aggregate 1 may be, for example, from 2, preferably 5, more preferably 10, or most preferably 20, to 30, or preferably 25.

The G/D ratio is the ratio of the spectral intensity of the peak called the G band observed around 1,590 cm$^{-1}$ to the spectral intensity of the peak called the D band observed around 1,350 cm$^{-1}$ in the Raman spectrum of the carbon nanotube.

The spectrum of the D band is derived from a defect of the carbon nanotube and the spectrum of the G band is derived from in-plane vibration of the six-membered ring of carbon.

The electric conductivity of the high-density carbon nanotube aggregate 1 in the thickness direction may be, for example, from 4,000 S/m, preferably 8,000 S/m, more preferably 15,000 S/m, or most preferably 22,000 S/m, to 50,000 S/m, or preferably 30,000 S/m. The electric conductivity may be measured by a known electric conductivity measuring device.

The thermal conductivity of the high-density carbon nanotube aggregate 1 in the thickness direction may be, for example, from 5 W/(m·K), preferably 10 W/(m·K), more preferably 20 W/(m·K), or most preferably 30 W/(m·K), to 60 W/(m·K), or preferably 40 W/(m·K). The thermal conductivity may be measured by a known thermal conductivity measuring device.

Such a high-density carbon nanotube aggregate 1 may be used for various industrial products, for example, as a heat conductive sheet or an electroconductive sheet.

2. Method of Producing the High-Density Carbon Nanotube Aggregate

Next, a method of producing the high-density carbon nanotube aggregate 1 will be described.

As shown in FIGS. 1A to 2C, the method of producing the high-density carbon nanotube aggregate 1 may include, for example, preparing a carbon nanotube array 13 placed on the substrate 8 (see FIGS. 1A to 1C) and heating the carbon nanotube array 13 (see FIGS. 1D to 2C).

Figure 1A:
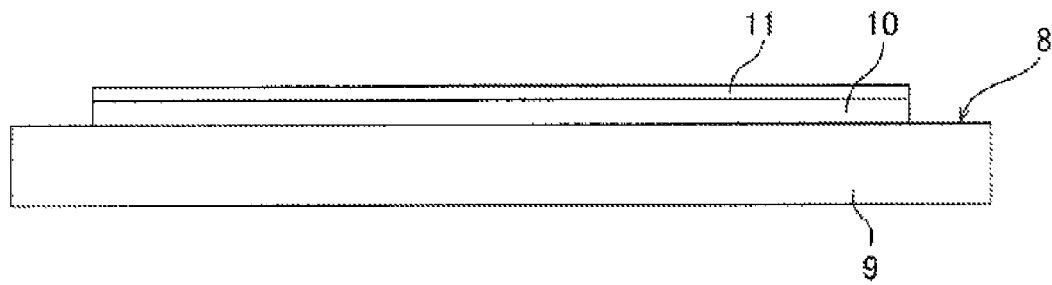
FIG. 1A illustrates an embodiment of a method of producing a high-density carbon nanotube aggregate of the present invention, showing a step of forming a catalyst layer on a substrate.

The first step of this production method may be to prepare the substrate 8, as shown in FIG. 1A.

The substrate 8 is not particularly limited, and examples thereof include known substrates used for a chemical vapor deposition method (CVD method), and the substrate 8 may be a commercially available substrate.

Specific examples of the substrate 8 include a silicon substrate and a stainless steel substrate 9 having a silicon dioxide film 10 stacked thereon, and the substrate 8 may preferably be a stainless steel substrate 9 having the silicon dioxide film 10 stacked thereon. In FIGS. 1A to 2A, 3A, and 3B, the substrate 8 is a stainless steel substrate 9 having a silicon dioxide film 10 stacked thereon.

Then, as shown in FIG. 1A, a catalyst layer 11 may be formed on the substrate 8, or preferably on the silicon dioxide film 10.

In order to form the catalyst layer 11 on the substrate 8, a metal catalyst film may be formed on the substrate 8 (or preferably the silicon dioxide film 10) by a known film formation method.

Examples of the metal catalyst may include iron, cobalt, and nickel, and iron is preferred. These metal catalysts can be used either singly or combinedly.

Examples of the film formation method include vacuum deposition and sputtering, and vacuum deposition is preferred.

Thus, the catalyst layer 11 may be disposed on the substrate 8.

In the case where the substrate 8 is a stainless steel substrate 9 having the silicon dioxide film 10 stacked thereon, the silicon dioxide film 10 and the catalyst layer 11 may be formed at the same time by, for example, as disclosed in Japanese Patent Application Publication No. 2014-94856, applying to the stainless steel substrate 9 a mixture solution in which a silicon dioxide precursor solution and a metal catalyst precursor solution are mixed, and then phase-separating and drying the mixture solution.

Figure 1B:
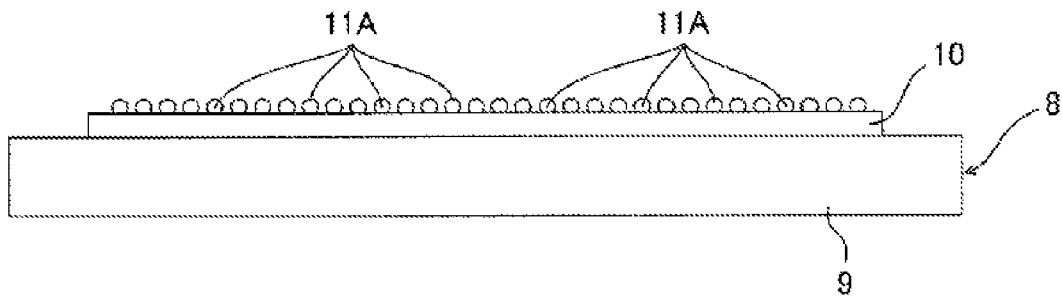
FIG. 1B shows a step subsequent to FIG. 1A, in which the substrate is heated to agglomerate the catalyst layer into a plurality of granules.

Then, as shown in FIG. 1B, the substrate 8 having the catalyst layer 11 disposed thereon may be heated to a temperature from 700° C. to 900° C. As a result, the catalyst layer 11 may aggregate into a plurality of granules 11A.

Figure 1C:
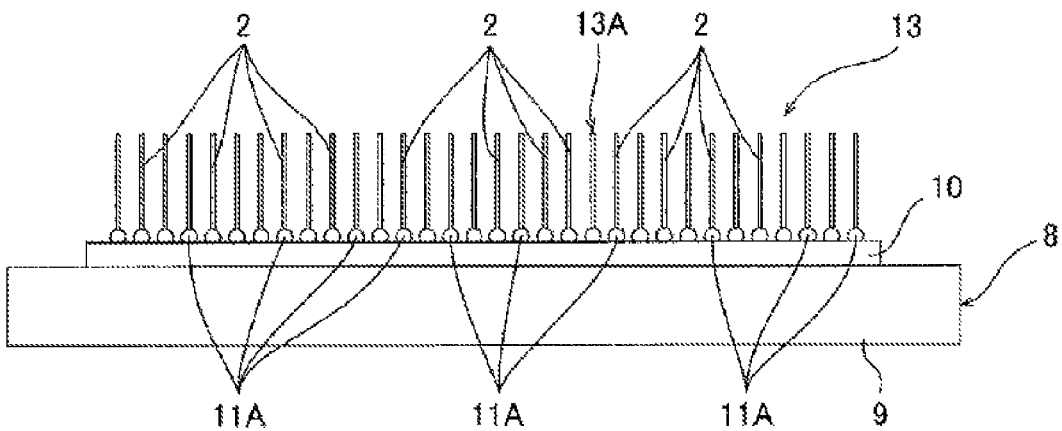
FIG. 1C shows a step subsequent to FIG. 1B, in which a carbon nanotube array is prepared by supplying a source gas to the plurality of granules and growing a plurality of carbon nanotubes.

Then, as shown in FIG. 1C, a source gas may be supplied to the heated substrate 8.

The source gas may contain a hydrocarbon gas (lower hydrocarbon gas) with a carbon number of 1 to 4.

Examples of the hydrocarbon gas with a carbon number of 1 to 4 include methane gas, ethane gas, propane gas, butane gas, ethylene gas, and acetylene gas, and acetylene gas may be preferred.

In addition, the source gas may contain hydrogen gas, inert gas (for example, helium, argon, etc.), water vapor, and the like, if necessary.

When the source gas contains hydrogen gas or an inert gas, the concentration of the hydrocarbon gas in the source gas may be, for example, from 1 volume %, or preferably 30 volume %, to 90 volume %, or preferably 50 volume %.

The supply time of the source gas may be, for example, from 1 minute, or preferably 5 minutes, to 60 minutes, or preferably 30 minutes.

As a result, a plurality of carbon nanotubes 2 may grow from the plurality of granules 11A. For convenience, FIG. 1C shows that one carbon nanotube 2 grows from one granule 11A. However, the present invention is not limited to this, and it may also be possible that a plurality of carbon nanotubes 2 grow from one granule 11A.

Each of the plurality of carbon nanotubes 2 may extend in the thickness direction of the substrate 8 so as to be substantially parallel to each other on the substrate 8. That is, the plurality of carbon nanotubes 2 may be oriented (vertically oriented) so as to be orthogonal to the substrate 8.

As a result, a carbon nanotube array 13 constituted by the plurality of carbon nanotubes 2 may be formed on the substrate 8.

As shown in FIG. 3A, such a carbon nanotube array 13 may include a plurality of rows 13A arranged in a longitudinal direction so that a plurality of carbon nanotubes 2 are arranged straight in a lateral direction.

In the carbon nanotube array 13, the average bulk density of the plurality of carbon nanotubes 2 may be, for example, from 10 mg/cm$^3$, or preferably 20 mg/cm$^3$, to 50 mg/cm$^3$.

Then, as shown in FIGS. 2A and 3B, the carbon nanotube array 13 may be separated from the substrate 8, if necessary.

Figure 1D:
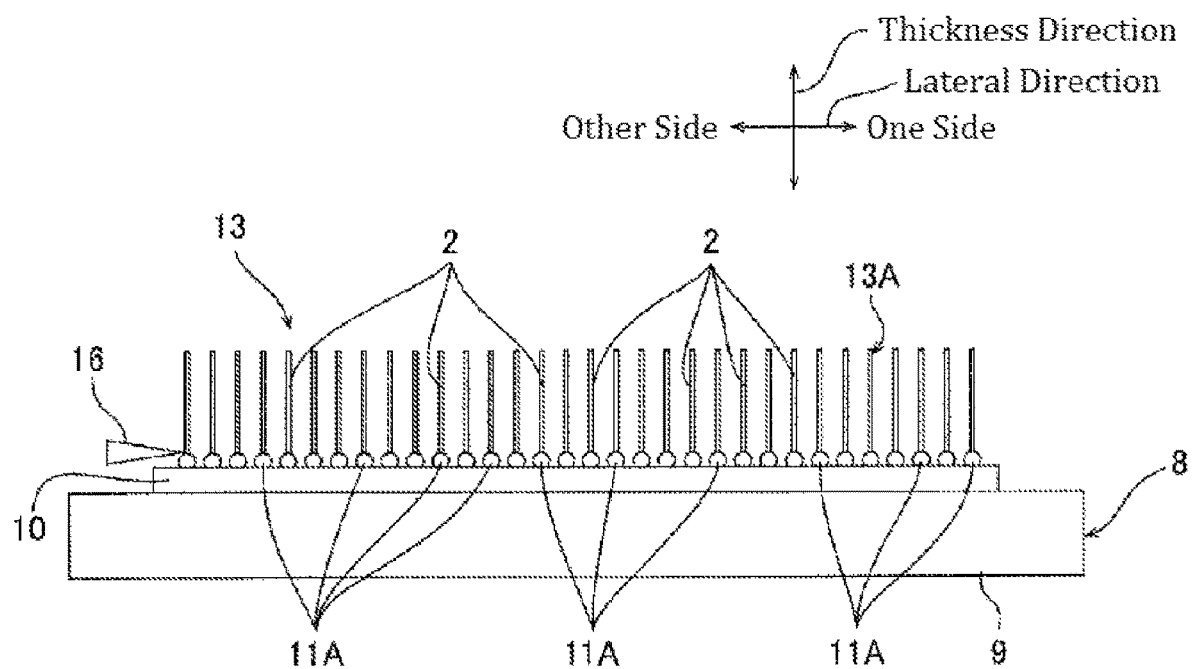
FIG. 1D shows a step subsequent to FIG. 1C, in which the carbon nanotube array is cut from the substrate.

In order to separate the carbon nanotube array 13 from the substrate 8, the base end portions (the end portions on the substrate 8 side) of the plurality of carbon nanotubes 2 may be cut in a lump by, for example, a cutting blade 16, as shown in FIG. 1D.

Examples of the cutting blade 16 include known metal blades such as a cutter blade and a razor blade, and a cutter blade is preferred. The longitudinal dimension of the cutting blade 16 may be larger than that of the carbon nanotube array 13.

Then, the cutting blade 16 may be placed on the upper surface of the substrate 8 so as to be laterally adjacent to the carbon nanotube array 13, and the cutting blade 16 may be slid in the lateral direction along the upper surface of the substrate 8.

As a result, the base end portions of the plurality of carbon nanotubes 2 may be cut in a lump, and the carbon nanotube array 13 may be separated from the substrate 8.

Next, as shown in FIG. 2A, the carbon nanotube array 13 separated from the substrate 8 may be pulled upward. As a result, the carbon nanotube array 13 may be separated from the substrate 8.

The carbon nanotube array 13 separated from the substrate 8 may retain its shape by van der Waals force or the like acting between adjacent carbon nanotubes 2 among the plurality of carbon nanotubes 2.

The average G/D ratio of such a carbon nanotube array 13 is, for example, equal to or larger than 1 and less than 2.

Next, as shown in FIG. 2C, the carbon nanotube array 13 may be heated.

In order to heat the carbon nanotube array 13, the carbon nanotube array 13 may be first placed in a heating furnace.

The heating furnace is not particularly limited, and examples thereof include a resistance heating furnace, an induction heating furnace, and a direct current electric furnace, and a resistance heating furnace is preferred. Further, the heating furnace may be of a batch type or a continuous type.

In addition, as shown in FIG. 2B, the carbon nanotube array 13 may preferably be placed in a heating furnace while being housed in a heat-resistant container 17.

The heat-resistant container 17 may resist temperatures greater than 2,600° C., and examples thereof include known heat-resistant containers such as a carbon container formed of carbon and a ceramic container formed of ceramic. Among such heat-resistant containers, a carbon container is preferred.

Such a heat-resistant container 17 may include, for example, a container body 17A opened upward and a lid portion 17B for closing the upper end portion of the container body 17A.

The shape of the container body 17A is not particularly limited, and examples thereof include a substantially box-like shape opened upward and a substantially cylindrical shape opened upward and closed at the lower end portion.

The inner dimension of the container body 17A in the vertical direction may be equal to or larger than the dimension of the carbon nanotube array 13 in the vertical direction, and may preferably be larger than the dimension of the carbon nanotube array 13 in the vertical direction. More specifically, the inner dimension of the container body 17A in the vertical direction may be, for example, from 1.0 times, or preferably 1.5 times to 10 times, or preferably 5 times as large as the dimension of the carbon nanotube array 13 in the vertical direction.

In addition, when the container body 17A has a substantially box-like shape, the inner dimensions of the container body 17A in the lateral direction and the longitudinal direction may be larger than the dimensions of the carbon nanotube array 13 in the lateral direction and the longitudinal direction, respectively. When the container body 17A has a substantially cylindrical shape, the inner diameter of the container body 17A may be larger than the dimensions of the carbon nanotube array 13 in the lateral direction and the longitudinal direction.

The carbon nanotube array 13 may preferably be accommodated in the heat-resistant container 17 so as to be spaced apart from the lid portion 17B in the vertical direction, and the carbon nanotube array 13 may more preferably be arranged so as to be spaced apart from the sidewalls of the container body 17A.

Next, an inert gas may be introduced into the heating furnace, and the inside air of the heating furnace may be replaced with an inert gas atmosphere. Examples of the inert gas include nitrogen and argon, and argon is preferred.

When the carbon nanotube array 13 is accommodated in the heat-resistant container 17, it may be possible to prevent the carbon nanotube array 13 from being blown off due to inflow of inert gas into the heating furnace, purging of the heating furnace, or the like.

Next, the temperature in the heating furnace may be raised to the heating temperature at a predetermined rate, and then the heating furnace may be left to stand for a predetermined time with the temperature maintained.

The rate of temperature increase may be, for example, from 1° C./min, preferably 3° C./min, or more preferably 5° C./min, to 40° C./min, preferably 20° C./min, or more preferably less than 10° C./min.

The heating temperature may be 2,600° C. or higher, preferably 2,700° C. or higher, or more preferably 2,800° C. or higher.

When the heating temperature is equal to or higher than the lower limit described above, it is possible to reliably aggregate the plurality of carbon nanotubes 2 in the carbon nanotube array 13.

The heating temperature may be lower than the sublimation temperature of the carbon nanotube 2, and is preferably 3,000° C. or lower.

When the heating temperature is equal to or lower than the upper limit described above, sublimation of the carbon nanotubes 2 can be suppressed.

The predetermined time (heating time) may be, for example, from ten minutes, or preferably one hour, to five hours, or preferably three hours.

When the predetermined time is equal to or longer than the lower limit described above, the plurality of carbon nanotubes 2 can be reliably aggregated in the carbon nanotube array 13, and when the predetermined time is equal to or less than the upper limit described above, mass production of the high-density carbon nanotube aggregate can be facilitated.

In addition, the carbon nanotube array 13 may preferably be heated in a no-load state (in a state in which no load is applied to the carbon nanotube array 13, that is, under atmospheric pressure).

In order to heat the carbon nanotube array 13 in the no-load state, as shown in FIG. 2C, the carbon nanotube array 13 may be placed in the heat-resistant container 17 so as to be spaced apart from the lid portion 17B in the vertical direction and spaced apart from the side walls of the container body 17A, and then the heat-resistant container 17 may be heated in the heating furnace.

Thus, the carbon nanotube array 13 may be heated.

When the carbon nanotube array 13 is heated as described above, the crystallinity of the graphene constituting the plurality of carbon nanotubes 2 may be improved in the carbon nanotube array 13, and the orientation (straightness) of the carbon nanotubes 2 may be improved. Then, in the carbon nanotube array 13, the carbon nanotubes 2 adjacent to each other may aggregate in a bundle shape while maintaining orientation (straightness) thereof by Van der Waals force or the like acting therebetween.

As a result, the whole carbon nanotube array 13 may be uniformly aggregated to prepare a high-density carbon nanotube aggregate 1. Then, the high-density carbon nanotube aggregate 1 may be cooled (for example, naturally cooled) as necessary.

The vertical dimension (thickness) of the high-density carbon nanotube aggregate 1 may be substantially the same as the vertical dimension (thickness) of the carbon nanotube array 13 prior to the heating, because the plurality of carbon nanotubes 2 aggregate while maintaining the orientation (straightness) thereof. More specifically, the vertical dimension of the high-density carbon nanotube aggregate 1 may be, for example, from 95% to 105% of that of the carbon nanotube array 13 prior to the heating, or it may preferably be 100% of the same.

The volume of the high-density carbon nanotube aggregate 1 may be, for example, from 5%, preferably 10%, or more preferably 20%, to 90%, preferably 85%, or more preferably 50% of the volume of the carbon nanotube array 13 prior to the aggregation.

In such a high-density carbon nanotube aggregate 1, as shown in FIGS. 2C and 3C, the average bulk density of a plurality of carbon nanotubes 2 oriented in the thickness direction and arranged in a sheet form may be from greater than 50 mg/cm$^3$ to 200 mg/cm$^3$.

Further, the proportion of the bulk density of each portion of the high-density carbon nanotube aggregate 1 to the average bulk density of the high-density carbon nanotube aggregate 1 (the percentage of the bulk density of a particular (any) portion to the average bulk density of the high-density carbon nanotube aggregate 1 set at 100%) may be from 80% to 120%. That is, the high-density carbon nanotube aggregate 1 may have less unevenness of the bulk density over the whole of the high-density carbon nanotube aggregate 1 as compared with the high-density carbon nanotube aggregate prepared by mechanical compression.

Therefore, in the whole of the high-density carbon nanotube aggregate, it is possible to improve both the thermal conductivity and the electric conductivity in the direction of orientation of the carbon nanotubes 2 (the thickness direction of the high-density carbon nanotube aggregate 1).

The heat treatment may be performed at least once or may be repeated two or more times. In the heat treatment, the crystallinity of the carbon nanotubes 2 and the average bulk density of the high-density carbon nanotube aggregate 1 can be controlled by appropriately changing the rate of temperature increase and the number of times of the heat treatment.

That is, the method of producing the high-density carbon nanotube aggregate 1 may preferably include a plurality of times of the heat treatment described above. In this case, the method of producing the high-density carbon nanotube aggregate 1 may include cooling the carbon nanotube array 13 (the high-density carbon nanotube aggregate 1) after the above-described heat treatment, and includes repetition of the heat treatment and the cooling.

In the following description, the heat treatment performed first is referred to as the first stage heat treatment, and the high-density carbon nanotube aggregate 1 subjected to the first heat treatment is referred to as the first stage high-density carbon nanotube aggregate 1. Further, the heat treatment performed for the n-th time (n is 2 or larger) is referred to as the n-th stage heat treatment (e.g., the second stage heat treatment), and the high-density carbon nanotube aggregate 1 subjected to the n-th stage heat treatment is referred to as the n-th stage high-density carbon nanotube aggregate 1 (e.g., a second stage high-density carbon nanotube aggregate 1).

More specifically, the high-density carbon nanotube aggregate 1 (the first stage high-density carbon nanotube aggregate 1) heated as described above may be cooled to a predetermined cooling temperature or lower (the cooling).

The method of cooling the high-density carbon nanotube aggregate 1 is not particularly limited, and it can be cooled by known methods or preferably natural cooling.

The rate of temperature decrease is not particularly limited and may be, for example, from −1° C./min, preferably −5° C./min, or more preferably −50° C./min, to −300° C./min, or preferably −150° C./min.

The cooling temperature may be from 2,000° C., preferably 1,000° C., or more preferably 40° C. to 0° C.

When the cooling temperature is not higher than the above upper limit, the crystallinity of graphene can be reliably improved, and the average G/D ratio of the high-density carbon nanotube aggregate 1 can be reliably improved.

The difference between the heating temperature and the cooling temperature (the heating temperature—the cooling temperature) may be, for example, from 600° C., preferably 1,000° C., or more preferably 2,500° C., to 3,000° C., or preferably 2,900° C.

When the difference between the heating temperature and the cooling temperature is within the above range, the crystallinity of graphene can be reliably improved, and the average G/D ratio of the high-density carbon nanotube aggregate 1 can be reliably improved.

Then, the high-density carbon nanotube aggregate 1 may be maintained at the cooling temperature or lower for a predetermined time.

The predetermined time may be, for example, from 1 sec, preferably 10 min, or more preferably 15 min, to 5 hours, preferably 3 hours, or more preferably 1 hour.

Next, the cooled high-density carbon nanotube aggregate 1 may be heated in the same manner as in the above heat treatment (the second stage heat treatment). Then, the heat treatment and the cooling may be sequentially repeated.

The number of times of repeating the heat treatment and the cooling may be, for example, from 2 to 100, or preferably 10, and the most preferable may be two.

When the number of times of repetition is equal to or larger than the above lower limit, the average G/D ratio of the high-density carbon nanotube aggregate 1 can be reliably improved. When the number of times of repetition is equal to or less than the above upper limit, particularly when it is two, mass productivity of the high-density carbon nanotube aggregate 1 can be improved.

As a result, the n-th stage high-density carbon nanotube aggregate 1 may be prepared.

The volume of the n-th stage high-density carbon nanotube aggregate 1 may be, for example, from 80% to 100% of the volume of the first stage high-density carbon nanotube aggregate 1, and the range of the average bulk density of the n-th stage high-density carbon nanotube aggregate 1 may be the same as that of the first stage high-density carbon nanotube aggregate 1. That is, in the n-th stage heat treatment, the rate of increase in the bulk density of the high-density carbon nanotube aggregate 1 is smaller than that in the first stage heat treatment.

In the n-th stage heat treatment, the crystallinity of the graphene constituting the carbon nanotube may be further improved. More specifically, the average G/D ratio of the n-th stage high-density carbon nanotube aggregate 1 may be, for example, from greater than 1 time, or preferably from 1.2 times, to 3 times, or preferably 2 times as large as the average G/D ratio of the first stage high-density carbon nanotube aggregate 1. The average G/D ratio of the first stage high-density carbon nanotube aggregate 1 may be, for example, from 2 to 20.

The method of producing the high-density carbon nanotube aggregate 1 may preferably include supplying a liquid to the carbon nanotube array 13 (the high-density carbon nanotube aggregate 1) after the above-described heat treatment (a liquid treatment).

Examples of a method of supplying the liquid to the high-density carbon nanotube aggregate 1 may include spraying the liquid on the high-density carbon nanotube aggregate 1 or immersing the high-density carbon nanotube aggregate 1 in the liquid. Among these methods of supplying the liquid, the method of immersing the high-density carbon nanotube aggregate 1 in the liquid may be preferable.

The liquid may volatilize at a normal temperature and pressure (a volatile liquid), and examples of such a liquid include water and organic solvents. Examples of the organic solvent include lower (C1-3) alcohols (e.g., methanol, ethanol, propanol), ketones (e.g., acetone), ethers (e.g., diethyl ether, tetrahydrofuran), alkyl esters (e.g., ethyl acetate), halogenated aliphatic hydrocarbons (e.g., chloroform, dichloromethane), polar aprotic compounds (e.g., N-methylpyrrolidone, dimethylformamide), aliphatic hydrocarbons (e.g., hexane, heptane, octane), alicyclic hydrocarbons (e.g., cyclohexane, methylcyclohexane), aromatic hydrocarbons (e.g., benzene, toluene), and the like.

Among such liquids, water, lower alcohols, and aliphatic hydrocarbons are preferred. These liquids can be used either singly or combinedly.

The temperature in the liquid treatment may be, for example, from 5° C., preferably 10° C., to 40° C., preferably 30° C.

The supply time of the liquid (the immersing time) may be, for example, from 3 minute, or preferably 5 minutes to 120 minutes, or preferably 90 minutes.

Then, the high-density carbon nanotube aggregate 1 may be dried (for example, naturally dried) as necessary by a known method.

As a result, the high-density carbon nanotube aggregate 1 may be subjected to a liquid treatment.

When the liquid is supplied to the high-density carbon nanotube aggregate 1, the liquid is vaporized, whereby the plurality of carbon nanotubes 2 aggregate with each other while maintaining the orientation, and the density of the high-density carbon nanotube aggregate 1 may be further increased.

More specifically, the volume of the high-density carbon nanotube aggregate 1 subjected to the liquid treatment may be, for example, from 30%, or preferably 50%, to 90%, preferably 80%, or more preferably 70% of the volume of the high-density carbon nanotube aggregate 1 prior to the liquid treatment.

In such a high-density carbon nanotube aggregate 1 subjected to the liquid treatment, the average bulk density of a plurality of carbon nanotubes 2 may be from 100 mg/cm$^3$ to 300 mg/cm$^3$.

It may also be possible to combine a plurality of times of heat treatment and liquid treatment. That is, the heat treatment, the cooling, and the liquid treatment may be repeated sequentially. Further, it may also be possible to repeat the heat treatment and the cooling sequentially and then perform the liquid treatment, or to perform the first stage heat treatment and the liquid treatment and then repeat the heat treatment and the cooling sequentially.

In the method of producing the high-density carbon nanotube aggregate 1, the carbon nanotube array 13 constituted by a plurality of carbon nanotubes 2 may be heated to a temperature from 2,600° C. to 3,000° C., as shown in FIG. 2C.

As a result, the crystallinity of the graphene constituting the carbon nanotubes 2 may be improved, and the orientation (straightness) of the carbon nanotubes 2 may be improved. Thus, the plurality of carbon nanotubes 2 may aggregate in the carbon nanotube array 13.

As a result, in the high-density carbon nanotube aggregate 1, it may be possible to increase the average density of the plurality of carbon nanotubes 2 while maintaining the orientation of the plurality of carbon nanotubes 2, and it is also possible to uniform the density of the plurality of carbon nanotubes 2, as compared with the case where the high-density carbon nanotube aggregate 1 is prepared by aggregation caused by liquid evaporation or by mechanical compression.

Thus, in the high-density carbon nanotube aggregate, it may be possible to improve both the thermal conductivity and the electric conductivity in the direction of orientation of the carbon nanotubes 2.

Since the above high-density carbon nanotube aggregate 1 can be produced by a simple method, the production cost can be reduced.

As shown in FIGS. 2A to 2C, the carbon nanotube array 13 may be heated after being separated from the substrate 8.

Therefore, in the carbon nanotube array 13, it is possible to smoothly aggregate the plurality of carbon nanotubes 2 while reliably maintaining the orientation thereof.

In the heat treatment, dissolution of the substrate 8 can be suppressed, and as a result, it can be suppressed that the dissolved substrate 8 adhere to the carbon nanotube array 13 or a heating furnace.

As shown in FIG. 2C, the carbon nanotube array 13 may be heated in the no-load state. Therefore, smooth aggregation of the plurality of carbon nanotubes 2 can be secured, and the breakage of the high-density carbon nanotube aggregate 1 can be suppressed.

Further, it may be possible to perform the heat treatment two or more times. More specifically, it may also be possible to sequentially repeat the heat treatment of the carbon nanotube array 13 and the cooling of the carbon nanotube array 13.

Thus, the crystallinity of the graphene constituting the carbon nanotube 2 can be further improved, and as a result, the thermal conductivity and the electric conductivity of the high-density carbon nanotube aggregate 1 (the n-th stage high-density carbon nanotube aggregate 1) can be improved reliably.

Further, it may also be possible to supply a liquid to the carbon nanotube array 13 (the high-density carbon nanotube aggregate 1) subjected to the heat treatment.

As a result, when the liquid is vaporized, the carbon nanotubes 2 adjacent to each other in the high-density carbon nanotube aggregate 1 may aggregate while maintaining the orientation thereof. Therefore, the density of the high-density carbon nanotube aggregate 1 can be further increased.

When most of the plurality of carbon nanotubes 2 in the high-density carbon nanotube aggregate 1 are in contact with each other, it may be possible that a part of the carbon nanotubes 2 are disposed with a slight space therebetween. More specifically, when all of the plurality of carbon nanotubes 2 are taken as 100%, for example, from 90%, preferably 95%, or more preferably 98% to 100%, or preferably less than 100% of the carbon nanotubes 2 may be in contact with each other.

EXAMPLES

The following Examples will illustrate the present invention more specifically, but the present invention is not limited to these Examples. The following description contains specific numerical values such as compounding ratio (content ratio), physical property values, and parameters. These specific numerical values can be replaced with the upper limit values (defined with "to" or "less than") or the lower limit values (defined with "from" or "greater than") of the compounding ratio (content ratio), physical property values, parameters that correspond to the specific numerical values and described in "DESCRIPTION OF EXAMPLE EMBODIMENTS" above.

Example 1

A silicon dioxide film was stacked on the entire stainless steel substrate, and then iron was deposited as a catalyst layer on the silicon dioxide film. The substrate had a substantially rectangular shape in a plan view.

Next, the substrate was heated to 700° C. and a raw material gas (acetylene gas) was supplied to the catalyst layer for 15 minutes. As a result, a carbon nanotube array having a substantially rectangular shape in a plan view was formed on the substrate. In the carbon nanotube array, the plurality of carbon nanotubes extended substantially in parallel with each other and were oriented (vertically oriented) so as to be orthogonal to the substrate.

The average outer diameter of the carbon nanotubes was about 12 nm, and the average length of the carbon nanotubes was about 200 μm.

The dimension of the carbon nanotube array in the longitudinal direction was 20 mm, the dimension of the carbon nanotube array in the lateral direction was 30 mm, and the dimension of the carbon nanotube array in the vertical direction was the same as the average length of the carbon nanotubes. Therefore, the area of the carbon nanotube array was 600 mm², and the volume of the same was 120 mm³.

The average bulk density of the plurality of carbon nanotubes in the carbon nanotube array was about 50 mg/cm³.

Next, the cutter blade was moved along the substrate, and the carbon nanotube array was cut away from the substrate for separation.

Next, the separated carbon nanotube array was placed in a carbon container which resists heat, and the carbon container was placed in a resistance heating furnace. The carbon container includes a container body opened upward and a lid portion closing the upper end portion of the container body. The inner dimension of the container body in the vertical direction was 1 mm, the inner dimension in the longitudinal direction was 45 mm, and the inner dimension in the lateral direction was 45 mm.

More specifically, the carbon nanotube array was contained in the carbon container so as to be spaced from the lid portion in the vertical direction and spaced from the side walls of the carbon container in the longitudinal direction and the lateral direction. In other words, the carbon nanotube array was in a no-load state when contained in the carbon container.

Subsequently, the gas in the resistance heating furnace was replaced with an argon atmosphere, and then the argon atmosphere was heated to 2,800° C. at a rate of 10° C./min and maintained at 2,800° C. for two hours.

Thus, the carbon nanotube array contained in the carbon container was heated in the no-load state to prepare a high-density carbon nanotube aggregate.

The high-density carbon nanotube aggregate was then cooled to the room temperature by natural cooling (the rate of temperature decrease: −100° C./min).

The dimension of the high-density carbon nanotube aggregate in the longitudinal direction was 11 mm, the dimension of the high-density carbon nanotube aggregate in the lateral direction was 22 mm, and the dimension of the high-density carbon nanotube aggregate in the vertical direction was about 200 μm.

Therefore, the area of the high-density carbon nanotube aggregate was 242 mm², and the volume of the same was 48 mm³.

Example 2

A carbon nanotube array including a plurality of carbon nanotubes having an average length of about 100 μm was formed in the same manner as in Example 1.

That is, the dimension of the carbon nanotube array in the longitudinal direction was 20 mm, the dimension of the carbon nanotube array in the lateral direction was 30 mm, and the dimension of the carbon nanotube array in the vertical direction was about 100 μm.

The average bulk density of the plurality of carbon nanotubes in the carbon nanotube array was about 50 mg/cm³.

Subsequently, as in Example 1, the carbon nanotube array was separated from the substrate, subjected to a heat treatment, and then allowed to cool naturally to obtain a high-density carbon nanotube aggregate.

The dimension of the high-density carbon nanotube aggregate in the longitudinal direction was 11 mm, the dimension of the high-density carbon nanotube aggregate in the lateral direction was 22 mm, and the dimension of the high-density carbon nanotube aggregate in the vertical direction was about 100 μm.

Example 3

A carbon nanotube array including a plurality of carbon nanotubes having an average length of about 300 μm was formed in the same manner as in Example 1.

That is, the dimension of the carbon nanotube array in the longitudinal direction was 20 mm, the dimension of the carbon nanotube array in the lateral direction was 30 mm, and the dimension of the carbon nanotube array in the vertical direction was about 300 μm.

The average bulk density of the plurality of carbon nanotubes in the carbon nanotube array was about 50 mg/cm³.

Subsequently, as in Example 1, the carbon nanotube array was separated from the substrate, subjected to a heat treatment, and then allowed to cool naturally to obtain a high-density carbon nanotube aggregate.

The dimension of the high-density carbon nanotube aggregate in the longitudinal direction was 11 mm, the dimension of the high-density carbon nanotube aggregate in the lateral direction was 22 mm, and the dimension of the high-density carbon nanotube aggregate in the vertical direction was about 300 μm.

Example 4

A high-density carbon nanotube aggregate was obtained in the same manner as in Example 1 except that the heating temperature of the carbon nanotube array was changed from 2,800° C. to 2,600° C.

The dimension of the high-density carbon nanotube aggregate in the longitudinal direction was 18 mm, the dimension of the high-density carbon nanotube aggregate in the lateral direction was 27 mm, and the dimension of the high-density carbon nanotube aggregate in the vertical direction was about 200 μm.

Example 5

A high-density carbon nanotube aggregate was prepared in the same manner as in Example 1 except that the heating temperature of the carbon nanotube array was changed from 2,800° C. to 2,900° C.

The dimension of the high-density carbon nanotube aggregate in the longitudinal direction was 13 mm, the dimension of the high-density carbon nanotube aggregate in the lateral direction was 18 mm, and the dimension of the high-density carbon nanotube aggregate in the vertical direction was about 200 μm.

Example 6

A high-density carbon nanotube aggregate was prepared in the same manner as in Example 1 except that the heating temperature of the carbon nanotube array was changed from 2,800° C. to 3,000° C.

The dimension of the high-density carbon nanotube aggregate in the longitudinal direction was 12 mm, the dimension of the high-density carbon nanotube aggregate in the lateral direction was 17 mm, and the dimension of the high-density carbon nanotube aggregate in the vertical direction was about 200 μm.

Example 7

A high-density carbon nanotube aggregate was prepared in the same manner as in Example 5 except that a carbon plate having a weight of about 2 kg was placed on the carbon nanotube array when the carbon nanotube array was heated.

Example 7 resulted in breakage of a part of the high-density carbon nanotube aggregate 1.

Example 8

A carbon nanotube array separated from the substrate was prepared in the same manner as in Example 1 except that the average length of the carbon nanotubes was about 300 μm.

Next, as in Example 1, the separated carbon nanotube array was placed in a carbon container, and the carbon container was placed in a resistance heating furnace.

Subsequently, the gas in the resistance heating furnace was replaced with an argon atmosphere, and then the argon atmosphere was heated to 2,800° C. at a rate of 3° C./min (in a range from 2,400 to 2,800° C.) and maintained at 2,800° C. for two hours (the first stage heat treatment).

Thus, the carbon nanotube array contained in the carbon container was heated in the no-load state to prepare a first stage high-density carbon nanotube aggregate.

The first stage high-density carbon nanotube aggregate was then cooled to the room temperature by natural cooling (the rate of temperature decrease: about −100° C./min) (the cooling).

The dimension of the first stage high-density carbon nanotube aggregate in the longitudinal direction was 11 mm, the dimension of the first stage high-density carbon nanotube aggregate in the lateral direction was 22 mm, and the dimension of the first stage high-density carbon nanotube aggregate in the vertical direction was about 300 μm.

Therefore, the area of the first stage high-density carbon nanotube aggregate was 242 mm$^2$, and the volume of the same was 72.6 mm$^3$.

Next, the first stage high-density carbon nanotube aggregate was placed in the carbon container again, and the carbon container was placed in the resistance heating furnace.

Subsequently, the gas in the resistance heating furnace was replaced with an argon atmosphere, and then the argon atmosphere was heated to 2,800° C. at a rate of 3° C./min (in a range from 2,400 to 2,800° C.) and maintained at 2,800° C. for two hours (the second stage heat treatment).

As a result, a second stage high-density carbon nanotube aggregate was prepared.

The second stage high-density carbon nanotube aggregate was then cooled to the room temperature by natural cooling (about −100° C./min) (the cooling).

The dimensions of the second stage high-density carbon nanotube aggregate were the same as the dimensions of the first stage high-density carbon nanotube aggregate.

Example 9

A second stage high-density carbon nanotube aggregate was prepared in the same manner as in Example 8 except that the heating temperature in the first stage heat treatment was changed to 2,600° C. and the heating temperature in the second stage heat treatment was changed to 2,600° C.

The dimensions of the first stage high-density carbon nanotube aggregate and the second stage high-density carbon nanotube aggregate in the longitudinal direction were 18 mm, the dimensions of these high-density carbon nanotube aggregates in the lateral direction were 27 mm, and the dimensions of these high-density carbon nanotube aggregates in the vertical direction were about 300 μm.

Example 10

A first stage high-density carbon nanotube aggregate was prepared in the same manner as in Example 8. The second stage heat treatment was not performed.

Example 11

A first stage high-density carbon nanotube aggregate was prepared in the same manner as in Example 8 except that the rate of temperature increase was changed to 1° C./min. The second stage heat treatment was not performed.

Example 12

As in Example 8, a carbon nanotube array was subjected to the first stage heat treatment, cooled from 2,800° C. to 2,000° C. at a rate of 5° C./min, and then cooled to the room temperature by natural cooling (the rate of temperature decrease: −100° C./min), thereby to prepare a first stage high-density carbon nanotube aggregate. The second stage heat treatment was not performed.

Example 13

A first stage high-density carbon nanotube aggregate was prepared in the same manner as in Example 8 except that the heating time in the first stage heat treatment was changed to four hours. The second stage heat treatment was not performed.

Example 14

A carbon nanotube array separated from the substrate was prepared in the same manner as in Example 1 except that the average length of the carbon nanotubes was about 100 μm.

The dimension of the carbon nanotube array in the longitudinal direction was 16 mm, the dimension of the carbon nanotube array in the lateral direction was 15 mm, and the dimension of the carbon nanotube array in the vertical direction was the same as the average length of the carbon nanotubes. Therefore, the area of the carbon nanotube array was 240 mm$^2$, and the volume of the same was 24 mm$^3$.

Next, as in Example 1, the separated carbon nanotube array was placed in a carbon container, and the carbon container was placed in a resistance heating furnace. The inner dimension of the container body of the carbon container in the vertical direction was 0.5 mm.

Subsequently, the gas in the resistance heating furnace was replaced with an argon atmosphere, and then the argon atmosphere was heated to 2,800° C. at a rate of 3° C./min (in a range from 2,400 to 2,800° C.) and maintained at 2,800° C. for two hours.

Thus, the carbon nanotube array contained in the carbon container was heated in the no-load state to prepare a high-density carbon nanotube aggregate.

The high-density carbon nanotube aggregate was then cooled to the room temperature by natural cooling (about −100° C./min).

The dimension of the high-density carbon nanotube aggregate in the longitudinal direction was 10.2 mm, the dimension of the high-density carbon nanotube aggregate in the lateral direction was 9.2 mm, and the dimension of the high-density carbon nanotube aggregate in the vertical direction was about 100 μm.

Therefore, the area of the high-density carbon nanotube aggregate was 93.8 mm², and the volume of the same was 9.38 mm³.

Next, water was added into the container body of the carbon container, and the high-density carbon nanotube aggregate was immersed in water in the container body at the room temperature (25° C.) for ten minutes (the liquid treatment). The high-density carbon nanotube aggregate was then pulled out of water and dried naturally.

Thus, the high-density carbon nanotube aggregate was subjected to the liquid treatment.

The dimension of the liquid-treated high-density carbon nanotube aggregate in the longitudinal direction was 7.5 mm, the dimension of the same in the lateral direction was 7.5 mm, and the dimension of the same in the vertical direction was about 100 μm.

Therefore, the area of the high-density carbon nanotube aggregate subjected to the liquid treatment was 56.3 mm², and the volume of the same was 5.63 mm³.

Comparative Example 1

A heated carbon nanotube array (hereinafter referred to as the low-temperature heated carbon nanotube array) was prepared in the same manner as in Example 1 except that the heating temperature of the carbon nanotube array was changed from 2,800° C. to 2,200° C.

The dimension of the low-temperature heated carbon nanotube array in the longitudinal direction was 20 mm, the dimension of the low-temperature heated carbon nanotube array in the lateral direction was 30 mm, and the dimension of the low-temperature heated carbon nanotube array in the vertical direction was about 200 μm.

Comparative Example 2

A carbon nanotube array separated from the substrate was prepared in the same manner as in Example 1.

Figure 4A:
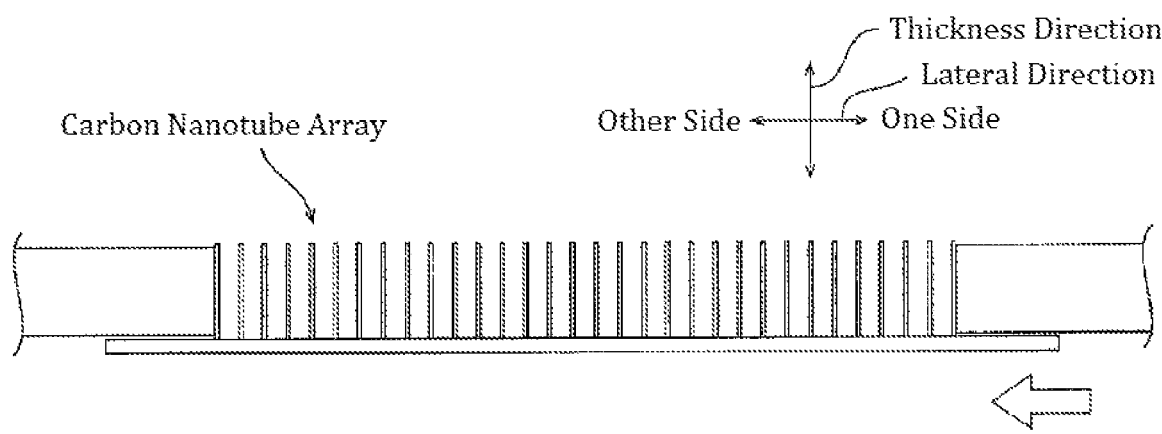
FIG. 4A illustrates mechanical compression of a carbon nanotube array of Comparative Example 2, showing the carbon nanotube array before compression.
Figure 4B:
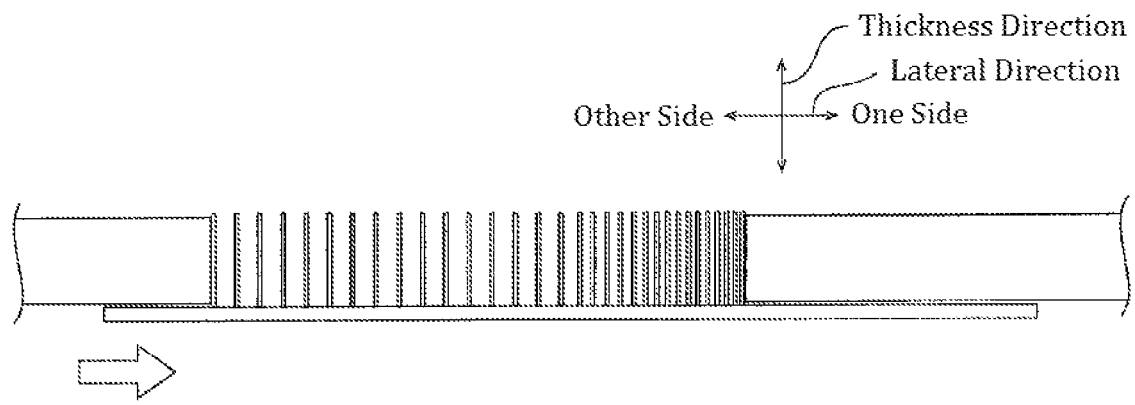
FIG. 4B shows a step subsequent to FIG. 4A, in which the carbon nanotube array is mechanically compressed from one side.
Figure 4C:
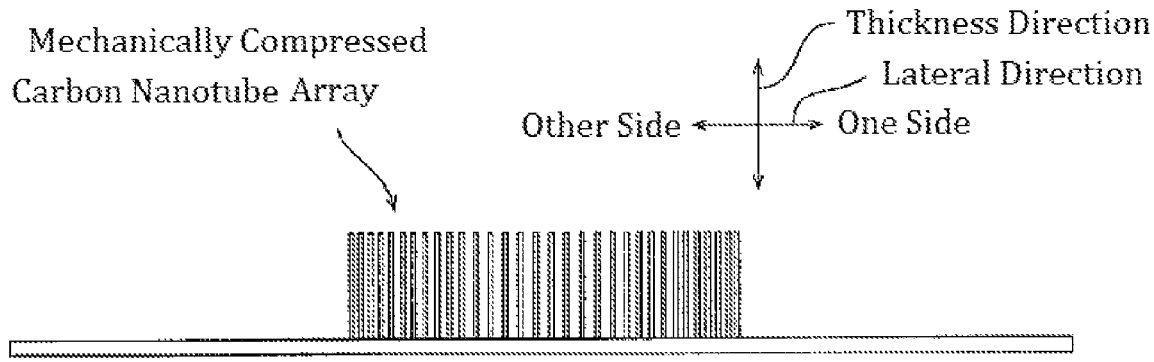
FIG. 4C shows a step subsequent to FIG. 4B, in which the carbon nanotube array is mechanically compressed from the other side to prepare a mechanically compressed carbon nanotube array of Comparative Example 2.

Next, as shown in FIGS. 4A to 4C, the carbon nanotube array was placed on a horizontal plane, the carbon nanotube array was mechanically compressed from one side in the lateral direction so that the dimension thereof in the lateral direction was 21 mm, and then the carbon nanotube array was mechanically compressed from the other side in the lateral direction so that the dimension thereof in the lateral direction was 12 mm.

Thus, a mechanically compressed carbon nanotube array was prepared.

The dimension of the mechanically compressed carbon nanotube array in the longitudinal direction was 20 mm, the dimension of the mechanically compressed carbon nanotube array in the lateral direction was 12 mm, and the dimension of the mechanically compressed carbon nanotube array in the vertical direction was about 200 μm.

Comparative Example 3

A carbon nanotube array including a plurality of carbon nanotubes having an average length of about 200 μm was prepared in the same manner as in Example 1. The carbon nanotube array was not heated.

Comparative Example 4

A carbon nanotube array including a plurality of carbon nanotubes having an average length of about 100 μm was prepared in the same manner as in Example 1. The carbon nanotube array was not heated.

Comparative Example 5

A carbon nanotube array including a plurality of carbon nanotubes having an average length of about 300 μm was prepared in the same manner as in Example 1. The carbon nanotube array was not heated.

Comparative Example 6

A carbon nanotube array was prepared in the same manner as in Example 14. The carbon nanotube array was not heated but subjected to the liquid treatment in the same manner as in Example 14.

At this time, in the carbon nanotube array, the orientation of a plurality of carbon nanotubes was disordered, and the plurality of carbon nanotubes aggregated locally at a plurality of sites, and were not uniformly densified. As a result, the carbon nanotube array had a porous structure, and the plurality of carbon nanotubes were disintegrated.

Evaluation (1) Measurement of G/D Ratio

The high-density carbon nanotube aggregates obtained in Examples and the carbon nanotube arrays (low-temperature heated carbon nanotube array, mechanically compressed carbon nanotube array, and carbon nanotube array) obtained in Comparative Examples were subjected to Raman spectral device (from JASCO Corporation), and the G/D ratios were calculated from the obtained Raman spectra. The results are listed in Tables 1 and 2.

Figure 5A:
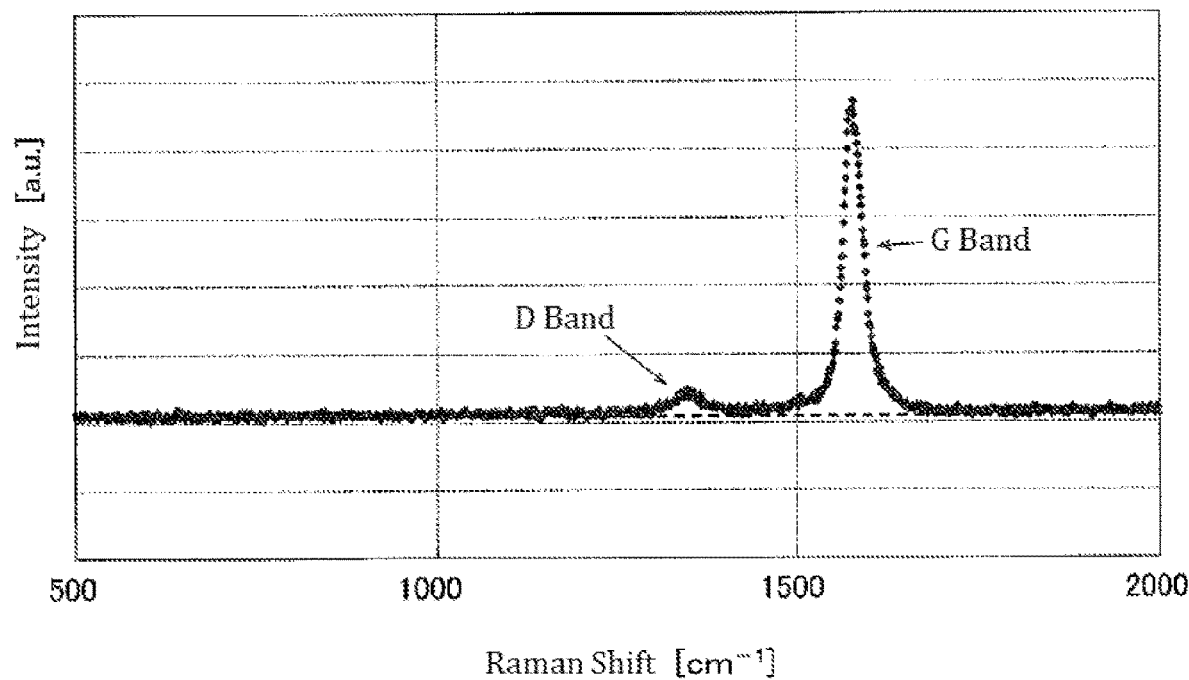
FIG. 5A shows the Raman spectrum of the high-density carbon nanotube aggregate of Example 1.
Figure 5B:
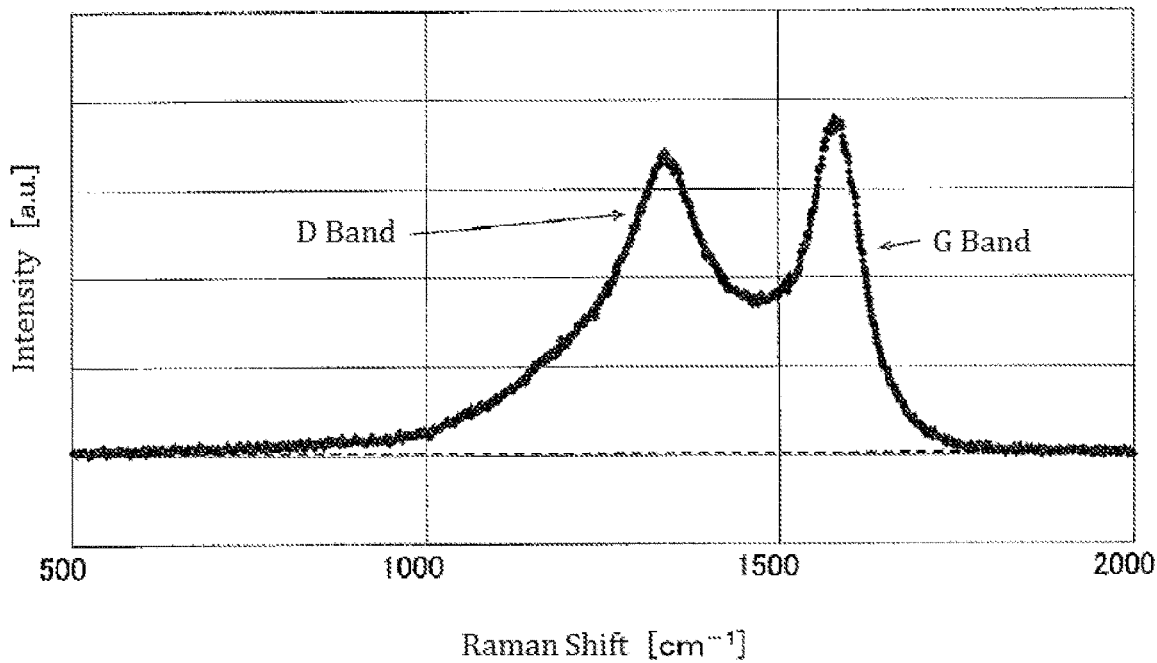
FIG. 5B shows the Raman spectrum of the high-density carbon nanotube aggregate of Comparative Example 3.

FIG. 5A shows the Raman spectrum of the high-density carbon nanotube aggregate of Example 1, and FIG. 5B shows the Raman spectrum of the carbon nanotube array of Comparative Example 3.

(2) Measurement of Average Bulk Density

The average bulk densities of the high-density carbon nanotube aggregates of Examples, the low-temperature heated carbon nanotube array of Comparative Example 1 and the mechanically compressed carbon nanotube array of Comparative Example 2 were measured.

The average bulk densities were calculated from the mass per unit area (basis weight (mg/cm²)) and the length of the carbon nanotubes (measured by SEM (from JEOL Ltd) or non-contact film thickness meter (from KEYENCE Corporation)).

Figure 6:
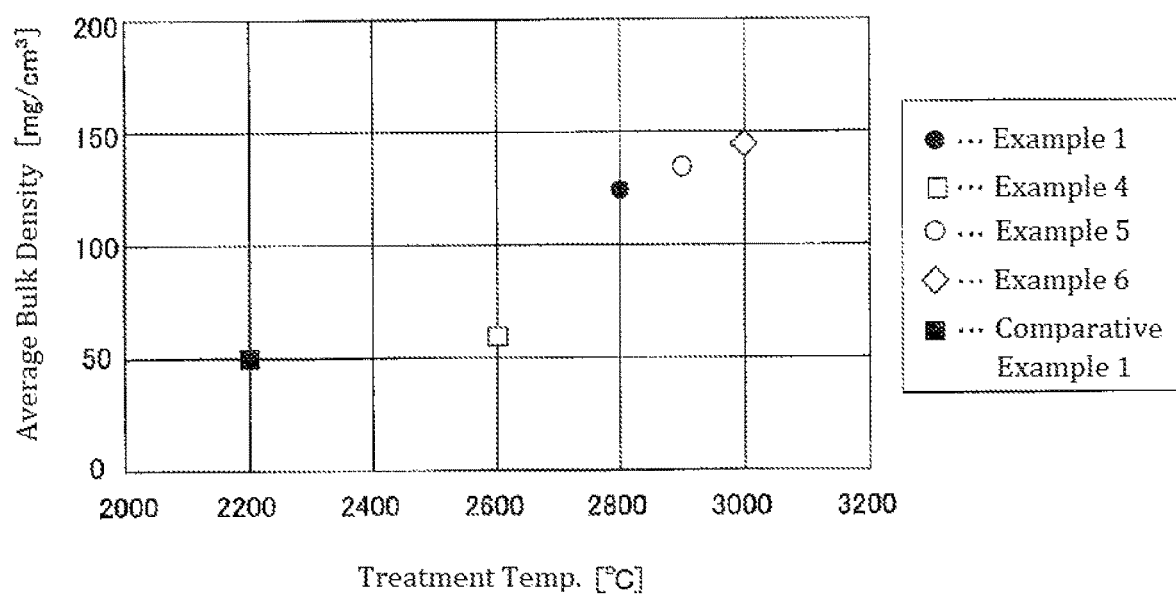
FIG. 6 is a graph showing the average bulk density with respect to the heat treatment temperature in Examples 1, 4 to 6 and Comparative Example 1.

FIG. 6 shows a graph of the average bulk density with respect to the heat treatment temperature.

(3) Measurement of Bulk Density at Parts of High-Density Carbon Nanotube Aggregates (Carbon Nanotube Arrays)

The following method was used to measure the bulk density at parts of the high-density carbon nanotube aggregates obtained in Examples and the carbon nanotube arrays obtained in Comparative Examples.

Figure 9:
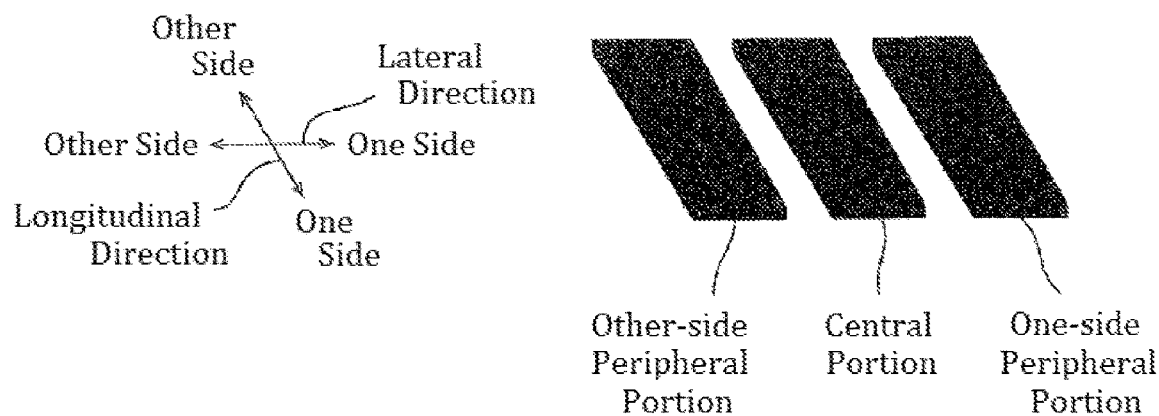
FIG. 9 illustrates a method of measuring the bulk density of each portion of the high-density carbon nanotube aggregates of Examples 1 to 7 and the carbon nanotube arrays of Comparative Examples 1 to 5.

More specifically, each of the high-density carbon nanotube aggregates (or the carbon nanotube arrays) was equally divided into three portions arranged in the lateral direction as shown in FIG. 9. One side portion of the high-density carbon nanotube aggregate (the carbon nanotube array) in the lateral direction was defined as one-side peripheral portion, a central portion of the high-density carbon nanotube aggregate (the carbon nanotube array) in the lateral direction was defined as a central portion, and the other side portion of the high-density carbon nanotube aggregate (the carbon nanotube array) in the lateral direction was defined as the other-side peripheral portion.

The bulk densities of the one-side peripheral portion, the central portion, and the other-side peripheral portion were calculated in the same manner as in the calculation of the average bulk density described above. Table 1 shows the bulk densities of the one-side peripheral portion and the central portion.

In the high-density carbon nanotube aggregates of Examples and the carbon nanotube arrays of Comparative Examples, the bulk density in the one-side peripheral portion was approximately the same as the bulk density in the other-side peripheral portion.

In the carbon nanotube array of Comparative Example 2, the bulk density of the other-side peripheral portion was 95 mg/cm$^3$.

Then, for each of the high-density carbon nanotube aggregates and the carbon nanotube arrays, the proportion of the bulk density of each portion (the one-side peripheral portion and the central portion) to the average bulk density was calculated. The results are listed in Table 1.

Figure 7A:
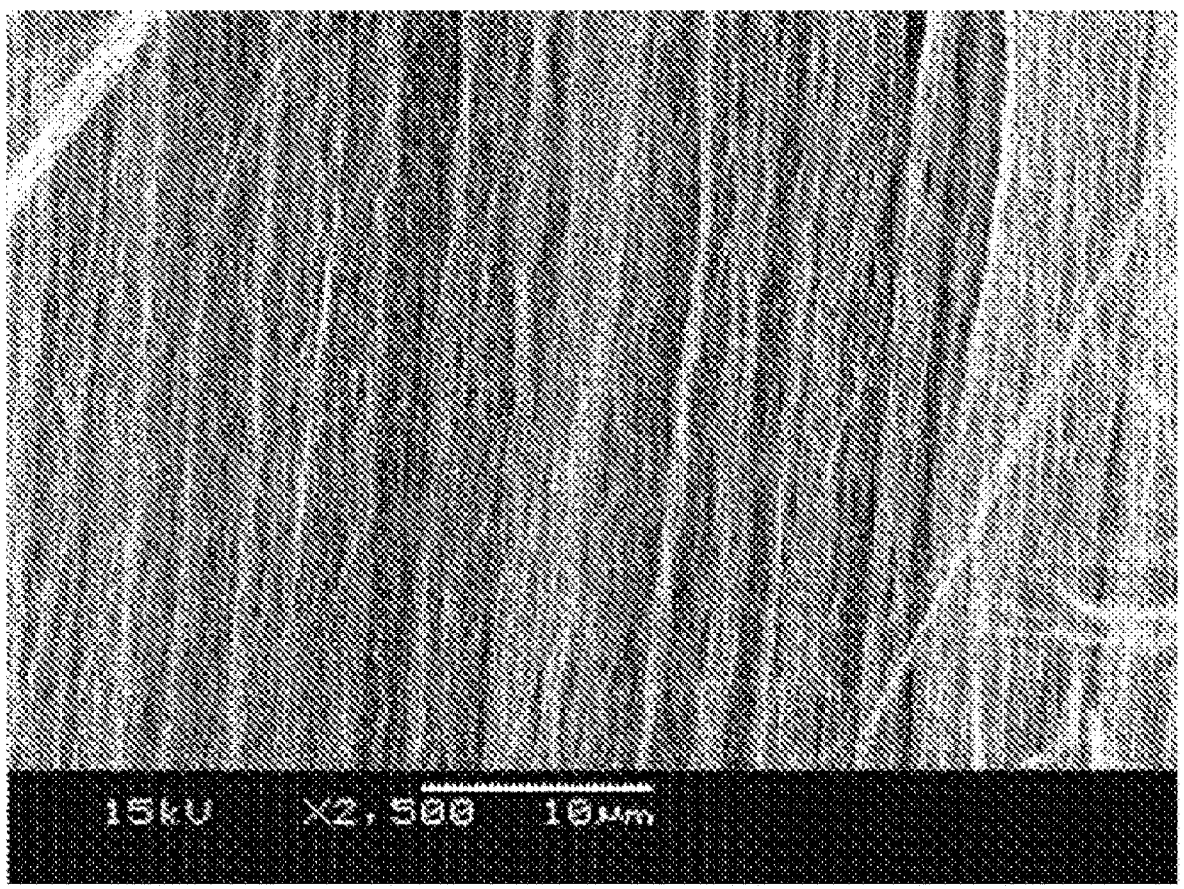
FIG. 7A shows a microphotograph of a peripheral portion of the high-density carbon nanotube aggregate of Example 1 taken by scanning electron microscope (SEM).
Figure 7B:
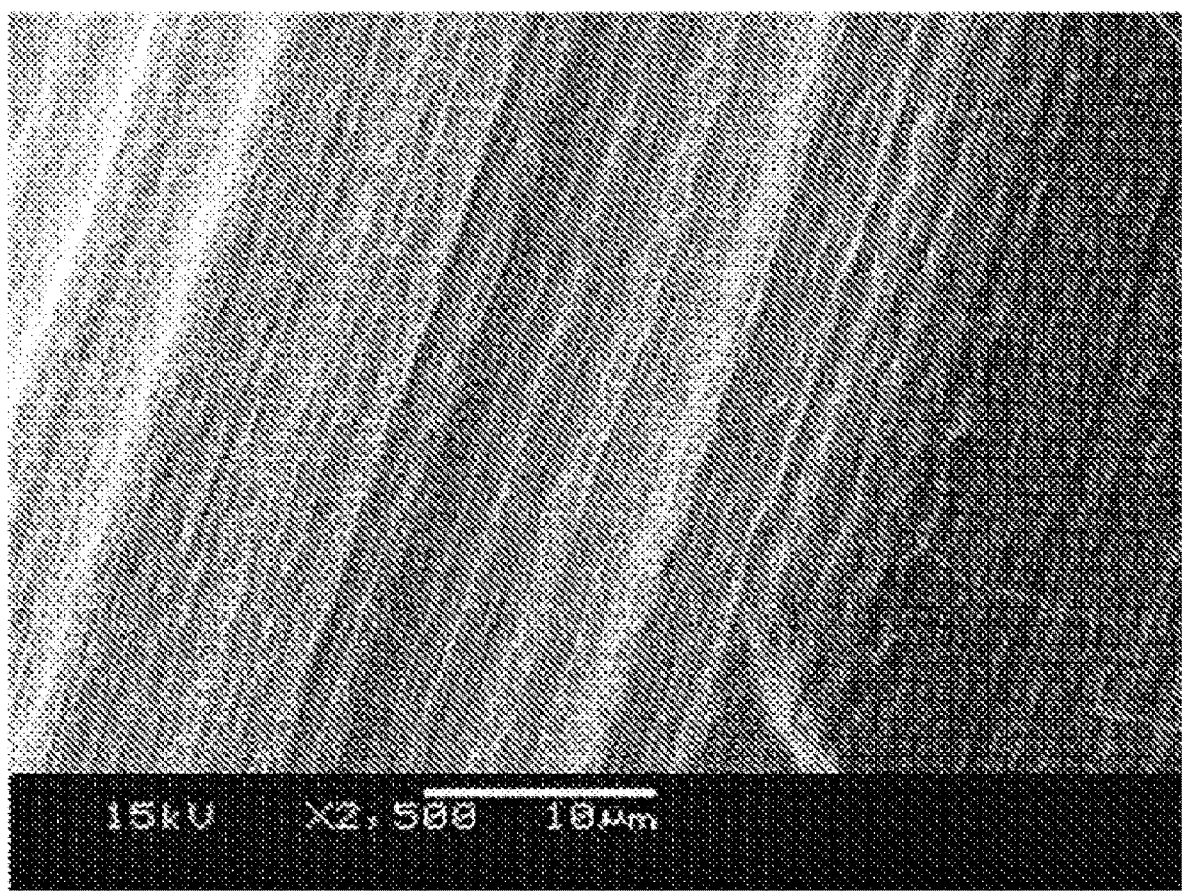
FIG. 7B shows a SEM photograph of a central portion of the high-density carbon nanotube aggregate of Example 1.

FIG. 7A shows a scanning electron microscope (SEM) photograph of a peripheral portion of the high-density carbon nanotube aggregate of Example 1, and FIG. 7B shows a SEM photograph of a central portion of the high-density carbon nanotube aggregate of Example 1.

Figure 8A:
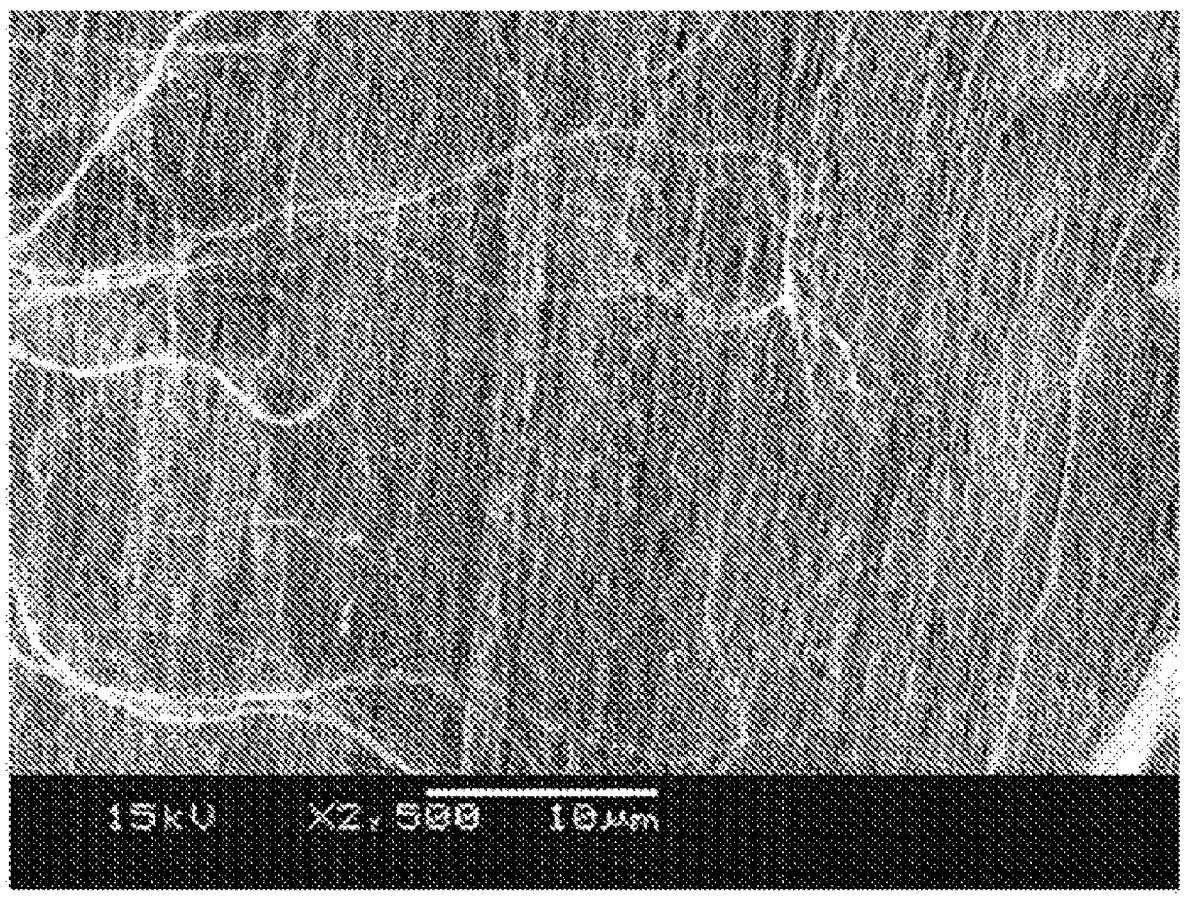
FIG. 8A shows a SEM photograph of a peripheral portion of the mechanically compressed high-density carbon nanotube aggregate of Comparative Example 2.
Figure 8B:
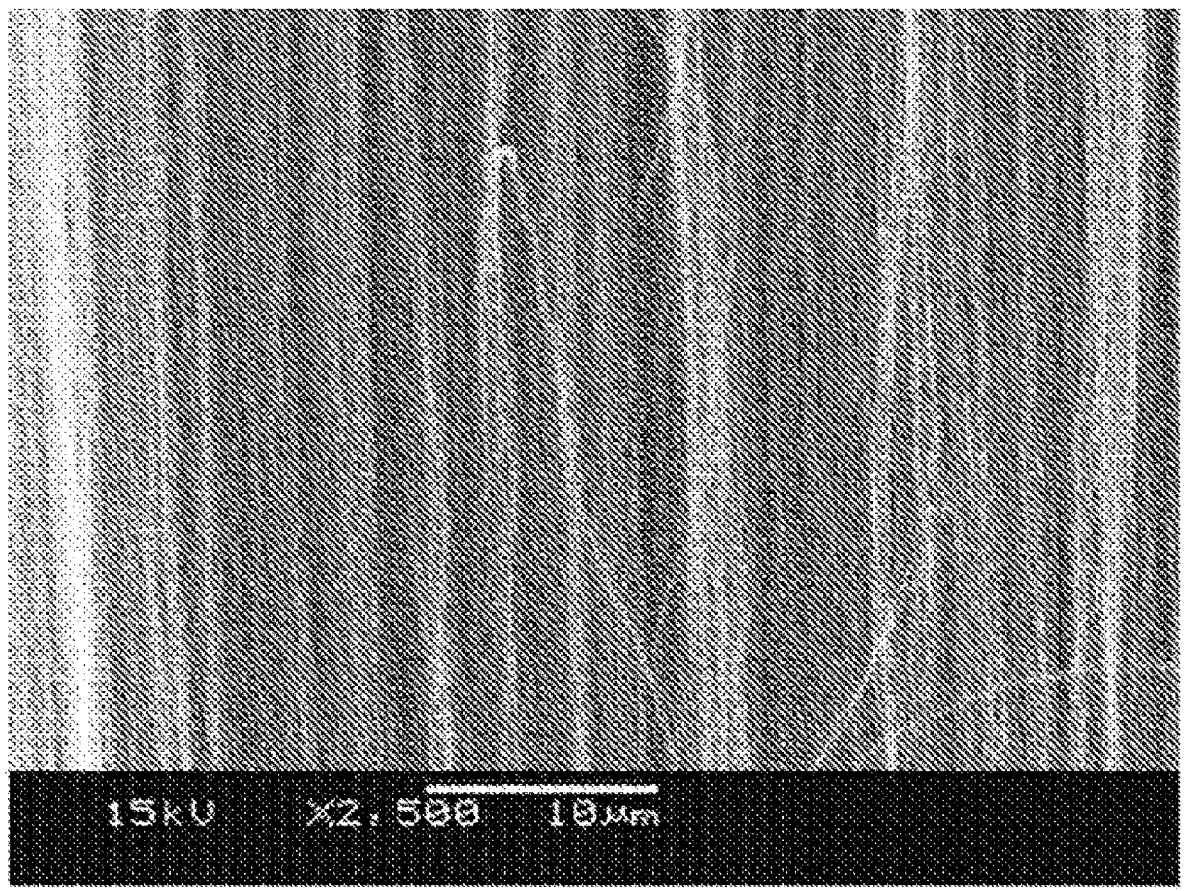
FIG. 8B shows a SEM photograph of a central portion of the mechanically compressed high-density carbon nanotube aggregate of Comparative Example 2.

FIG. 8A shows a SEM photograph of a peripheral portion of the mechanically compressed carbon nanotube array of Comparative Example 2, and FIG. 8B shows a SEM photograph of a central portion of the mechanically compressed carbon nanotube array of Comparative Example 2.

FIGS. 7A to 8B show that, in each of the peripheral portion and the central portion of the high-density carbon nanotube aggregate of Example 1, the plurality of carbon nanotubes aggregated in a bundle form while maintaining the orientation thereof, and the bundles of the carbon nanotubes were arranged densely.

By contrast, in the mechanically compressed carbon nanotube array of Comparative Example 2, it was observed that the plurality of carbon nanotubes were densified in the peripheral portion, but it was not observed that the plurality of carbon nanotubes aggregated in a bundle form, and the orientation of a part of the carbon nanotubes were disordered.

Electric Conductivity:

The electric conductivity in the thickness direction (the direction of orientation of the carbon nanotubes) was measured by an electric conductivity measurement device (from KEITHLEY) in the high-density carbon nanotube aggregates obtained in Examples and the carbon nanotube arrays obtained in Comparative Examples. The results are listed in Table 1. Since the high-density carbon nanotube aggregate obtained in Example 7 was partially broken, the electrical conductivity thereof was not measured.

Thermal Conductivity:

The thermal resistance in the thickness direction (the direction of orientation of the carbon nanotubes) was measured by a thermal resistance measurement device (product name: T3Ster DynTIM Tester from Mentor Graphics Corporation) in the high-density carbon nanotube aggregates obtained in Examples and the carbon nanotube arrays obtained in Comparative Examples.

Figure 10:
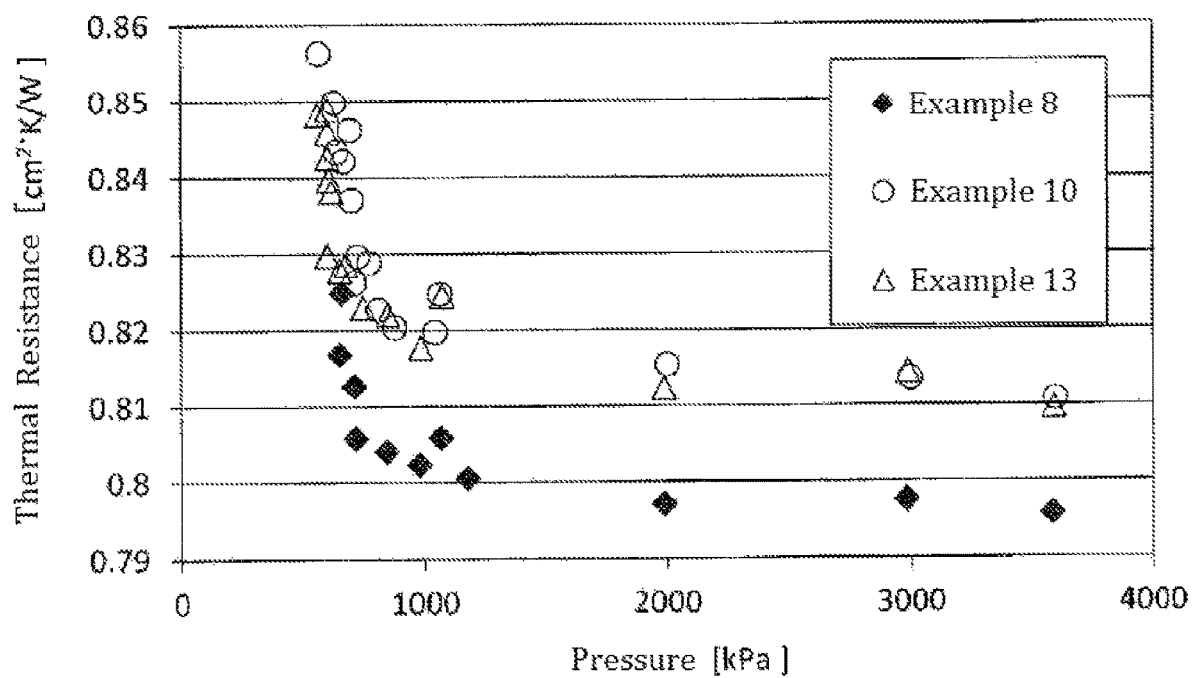
FIG. 10 is a graph showing the thermal resistance of the high-density carbon nanotube aggregates of Examples.

More specifically, each of the high-density carbon nanotube aggregates (carbon nanotube arrays) was sandwiched from the outside in the thickness direction (the direction of orientation of the carbon nanotubes) by a heater and a cold stage provided in the thermal resistance measuring device, and was pressurized by the heater with a predetermined pressure from the outside in the thickness direction. Then, the thermal resistance at each pressure was measured. The results are shown in FIG. 10.

The thermal conductivity was calculated from the measured thermal resistance. The results are listed in Tables 1 and 2.

TABLE 1

| No. | Heating Temp. [° C.] | G/D Ratio | Average Bulk Density [mg/cm$^3$] | Rate of Change in Average Density | One-sided Peripheral Portion Bulk Density [mg/cm$^3$] | One-sided Peripheral Portion Bulk Density/Average Bulk Density [%] | Central Portion Bulk Density [mg/cm$^3$] | Central Portion Bulk Density/Average Bulk Density [%] | Electric Conductivity [S/m] | Thermal Conductivity [W/(m·K)] |
|---|---|---|---|---|---|---|---|---|---|---|
| Example 1 | 2800 | 13.7 | 125 | 2.5 | 121 | 97 | 126 | 101 | 20000 | 29 |
| Example 2 | 2800 | 13.7 | 125 | 2.5 | 125 | 100 | 116 | 93 | | |
| Example 3 | 2800 | 13.7 | 125 | 2.5 | 138 | 110 | 124 | 99 | | |
| Example 4 | 2600 | 13.3 | 60 | 1.2 | 58 | 97 | 66 | 110 | 8000 | 10 |
| Example 5 | 2900 | 13.9 | 135 | 2.7 | 130 | 96 | 138 | 102 | 25000 | 31 |
| Example 6 | 3000 | 14.4 | 145 | 2.9 | 132 | 91 | 149 | 103 | 26000 | 34 |
| Example 7 | 2900 | 13.9 | 100 | 2.0 | 96 | 96 | 100 | 100 | — | 20 |
| Comparative Example 1 | 2200 | 6.1 | 50 | 1 | 47 | 94 | 46 | 92 | 4500 | 6 |
| Comparative Example 2 | — | 1 | 125 | 2.5 | 95 | 76 | 185 | 148 | 4000 | 5 |
| Comparative Example 3 | — | 1 | 50 | 1 | 54 | 108 | 49 | 98 | 1500 | 3.6 |
| Comparative Example 4 | — | | | | 47 | 94 | 54 | 108 | | |
| Comparative Example 5 | — | | | | 51 | 102 | 47 | 94 | | |

TABLE 2

| No. | First Stage Heat Treatment ||||||  Second Stage Heat Treatment ||||||
|---|---|---|---|---|---|---|---|---|---|---|---|---|
| | Heating Temp. [° C.] | Heating Time [h] | G/D Ratio | Average Bulk Density [mg/cm³] | Rate of Change in Average Density | Thermal Conductivity [W/(m·K)] | Heating Temp. [° C.] | Heating Time [h] | G/D Ratio | Average Bulk Density [mg/cm³] | Rate of Change in Average Density | Thermal Conductivity [W/(m·K)] |
| Example 8 | 2800 | 2 | 18 | 125 | 2.5 | 25 | 2800 | 2 | 22 | 125 | 2.5 | 30 |
| Example 9 | 2600 | 2 | 13.3 | 60 | 1.2 | 10 | 2600 | 2 | — | 60 | 1.2 | — |
| Example 10 | 2800 | 2 | 18 | 125 | 2.5 | 25 | | | | | | |
| Example 11 | 2800 | 2 | 18 | 125 | 2.5 | 25 | | | | | | |
| Example 12 | 2800 | 2 | 18 | 125 | 2.5 | 25 | | | | | | |
| Example 13 | 2800 | 4 | 18 | 125 | 2.5 | 25 | | | | | | |

| No. | Heat Treatment ||||||  Liquid Treatment |||| Thermal Conductivity [W/(m·K)] |
|---|---|---|---|---|---|---|---|---|---|---|---|
| | Heating Temp. [° C.] | Heating Time [h] | G/D Ratio | Average Bulk Density [mg/cm³] | Rate of Change in Average Density | Thermal Conductivity [W/(m·K)] | Liquid | G/D Ratio | Average Bulk Density [mg/cm³] | Rate of Change in Average Density | |
| Example 14 | 2800 | 2 | 18 | 125 | 2.5 | 25 | Water | 18 | 208 | 4.2 | 40 |
| Comparative Example 6 | — | — | 1 | 50 | 1 | 3.6 | Water | | | — | |

The Embodiments of the present inventions described above are mere examples and are not limitative. Variations of the present invention obvious to those skilled in the art of the relevant technical field are included in the claims below.

INDUSTRIAL APPLICABILITY

The method of producing a high-density carbon nanotube aggregate of the present invention can be applied to production of high-density carbon nanotube aggregates used for various industrial products.

LIST OF REFERENCE NUMBERS 1 high-density carbon nanotube aggregate
2 carbon nanotube
8 substrate
13 carbon nanotube array

What is claimed is:

1. A method of producing a high-density carbon nanotube aggregate comprising the steps of:
 preparing a carbon nanotube array including a plurality of carbon nanotubes aligned on a substrate and oriented vertically to the substrate; and
 heating the carbon nanotube aggregate to 2,800° C. or higher in an inert gas atmosphere, for 10 minutes or more and 5 hours or less,
 wherein an average bulk density of the high-density carbon nanotube aggregate is from 100 mg/cm³ to 200 mg/cm³; and
 an average G/D ratio of the high-density carbon nanotube aggregate is from 2 to 30,
 wherein G refers to a first spectral intensity of a peak called the G band, and D refers to a second spectral intensity of another peak called the D band in the Raman spectrum of the carbon nanotube.

2. The method of producing the high-density carbon nanotube aggregate of claim 1, wherein heating the carbon nanotube array comprises:
 removing the carbon nanotube array from the substrate; and then heating the carbon nanotube array.

3. The method of producing the high-density carbon nanotube aggregate of claim 1, wherein heating the carbon nanotube array comprises heating the carbon nanotube array in a no-load state.

4. The method of producing the high-density carbon nanotube aggregate of claim 1 further comprising:
 cooling the carbon nanotube array to 2,000° C. or lower after heating the carbon nanotube array,
 wherein the steps of heating the carbon nanotube array and cooling the carbon nanotube array are repeated sequentially.

5. The method of producing the high-density carbon nanotube aggregate of claim 1, further comprising supplying a liquid to the carbon nanotube array after heating the carbon nanotube array.

6. A high-density carbon nanotube aggregate produced by a method of producing a high-density carbon nanotube aggregate of comprising the steps of:
 preparing a carbon nanotube array including a plurality of carbon nanotubes aligned on a substrate and oriented vertically to the substrate; and
 heating the carbon nanotube array to 2,800° C. or higher in an inert gas atmosphere for 10 minutes or more and 5 hours or less,
 wherein an average bulk density of the plurality of carbon nanotubes is from 100 mg/cm³ to 200 mg/cm³; and
 an average G/D ratio of the high-density carbon nanotube aggregate is from 2 to 30, wherein G refers to a first spectral intensity of a peak called the G band, and D refers to a second spectral intensity of another peak called the D band in the Raman spectrum of the carbon nanotube.

* * * * *